(12) United States Patent
Alhadeff et al.

(10) Patent No.: US 8,484,563 B2
(45) Date of Patent: *Jul. 9, 2013

(54) VIEW CONFIRMATION FOR ON-DEMAND MULTIMEDIA CONTENT

(75) Inventors: Laurent Daniel Alhadeff, New York, NY (US); Richard Adam Smullen, New York, NY (US)

(73) Assignee: Beezag Inc., New York, NY (US)

( * ) Notice: Subject to any disclaimer, the term of this patent is extended or adjusted under 35 U.S.C. 154(b) by 272 days.

This patent is subject to a terminal disclaimer.

(21) Appl. No.: 12/822,526

(22) Filed: Jun. 24, 2010

(65) Prior Publication Data

US 2010/0333129 A1    Dec. 30, 2010

Related U.S. Application Data

(63) Continuation-in-part of application No. 12/544,233, filed on Aug. 20, 2009.

(60) Provisional application No. 61/221,024, filed on Jun. 26, 2009.

(51) Int. Cl.
*G06F 3/00* (2006.01)
*G06F 3/048* (2006.01)

(52) U.S. Cl.
USPC ........... 715/719; 715/716; 715/835; 715/810; 715/962; 705/14.1; 705/14.4; 705/14.49

(58) Field of Classification Search
USPC ................. 715/700, 703, 716, 719, 733, 764, 715/765, 780, 781, 810, 835, 846, 864, 962; 705/1.1, 14.1, 14.12, 14.4, 14.49; 345/169, 345/173
See application file for complete search history.

(56) References Cited

U.S. PATENT DOCUMENTS

| 6,529,878 | B2 * | 3/2003 | De Rafael et al. | 705/14.19 |
|---|---|---|---|---|
| 2002/0133817 | A1 | 9/2002 | Markel | |
| 2004/0128680 | A1 | 7/2004 | Karaoguz et al. | |
| 2004/0261100 | A1 | 12/2004 | Huber et al. | |
| 2005/0010963 | A1 | 1/2005 | Zeng et al. | |
| 2006/0117158 | A1 | 6/2006 | Shionoya et al. | |
| 2006/0282319 | A1 * | 12/2006 | Maggio | 705/14 |
| 2007/0186252 | A1 * | 8/2007 | Maggio | 725/86 |
| 2007/0214049 | A1 | 9/2007 | Postrel | |
| 2008/0127249 | A1 | 5/2008 | Cruice | |
| 2008/0196060 | A1 * | 8/2008 | Varghese | 725/34 |
| 2008/0199042 | A1 * | 8/2008 | Smith | 382/100 |
| 2008/0295127 | A1 * | 11/2008 | Zmuda | 725/23 |
| 2011/0145049 | A1 * | 6/2011 | Hertel et al. | 705/14.23 |

* cited by examiner

*Primary Examiner* — Xiomar L Bautista
(74) *Attorney, Agent, or Firm* — Ash Tankha; Lipton, Weinberger & Husick

(57) ABSTRACT

A computer implemented method and system is provided for confirming that a viewer viewed multimedia content on a client device. A server provisioned with the multimedia content is provided. The viewer creates a viewer account and accesses the server by supplying the viewer credentials. The viewer receives a list of multimedia content on the client device from the server, on demand for selection, and selects viewing parameters and multimedia content from the list. The client device receives and plays the selected multimedia content based on the selected viewing parameters. Viewing of the selected multimedia content is confirmed using a random challenge that is random in content, presented at random times during and/or after the play, and/or presented at random physical locations on the selected multimedia content. A response report is generated and the viewer is compensated if the response report confirms that the viewer has viewed the selected multimedia content.

25 Claims, 42 Drawing Sheets

MY BEEZAG

SCOTT HARROWER
EDIT PROFILE

CURRENT POINTS 27
OFFER LOCKER

2/8 EXPIRING SOON

VIDEOS

REEDEM REWARDS

HOW TO GET POINTS

INVITE A FRIEND

WHAT I'VE TOLD BEEZAG

HELP & FAQS

---

REDEEM REWARDS

GOOD NEWS SCOTT:
YOU HAVE GOT 27 POINTS IN YOUR BEEZAG ACCOUNT
YOU CAN REDEEM NOW OR AT ANY TIME. YOU HAVE 25 POINTS EARNED

REDEEM YOUR POINTS NOW! | GET PAID OR CONTRIBUTE TO CHARITIES

SPOT AN ERROR ON YOUR ACCOUNT TOTAL ABOVE. CHECK OUR FAQS. IF YOU DON'T FIND AN ANSWER DROP US A LINE

MY BEEZAG 61 VIDEOS VIEWED    TOTAL:27 POINTS

| | | | |
|---|---|---|---|
| WATCH | LADY GAGA | 03-29-2010 | 12 |
| WATCH | BEEZAG SHORE EPISODE 2 | 03-29-2010 | 15 |
| PURCHASE | SKULL CANDY | | 4 |
| SHARE | NIKE | 03-29-2010 | 15 |
| INVITE | FRIENDS | 03-17-2010 | 10 |
| BONUS | OUR GIFT TO YOU | 03-29-2010 | 5 |

BEEZAG CURRENT TOTAL        27 POINTS
GRAND TOTAL UPTO DATE       112 POINTS

REWARD HISTORY
COMPARE YOUR CURRENT EARNINGS TO YOUR PREVIOUS REWARDS

| TOTAL EARNED (TO DATE) | TOTAL REDEMPTION | TOTAL CHARITABLE CONTRIBUTION |
|---|---|---|
| 112POINTS | 47 POINTS | 32POINTS |

FIG. 16A

BEEZAG. WATCH. REWARD. SOCIALIZE.

WELCOME BACK, SCOTT
LOG OUT >

REDEEM REWARDS PROFILE > REDEMPTION OPTION > CONFIRM > FINISH

MY BEEZAG

SCOTT
HARROWER
EDIT PROFILE >

CURRENT
POINTS 27
OFFER LOCKER

2/8 EXPIRING
SOON

VIDEOS

REEDEM REWARDS

HOW TO GET POINTS

INVITE A FRIEND

WHAT I'VE TOLD
BEEZAG

HELP & FAQS

PREVIOUS TOTAL = $5.00 → REMAINING TOTAL = $0.00

PLEASE REVIEW THE INFORMATION BELOW. ONCE YOU CLICK "CONFIRM" YOU WILL NOT
BE ABLE TO EDIT THE INFO

PROFILE INFORMATION                                    EDIT >

FULL NAME    : SCOTT HARROWER
ADDRESS      : 115 29 ST., SUITE 800
               NEW YORK, NY 10024
CELL PHONE   : 1.917.8335703
PAYPAL EMAIL : NORMANHARROWER@YAHOO.COM

REDEMPTION OPTION                                      EDIT >

AMOUNT FROM BEEZAG ACCOUNT: $5.00

YOU WOULD LIKE TO: GET PAID VIA PAYPAL

CANCEL >                    EVERYTHING LOOKS GOOD    CONTINUE

FIG. 16D

BEEZAG. WATCH. REWARD. SOCIALIZE.

WELCOME BACK, SCOTT
LOG OUT ›

REDEEM REWARDS PROFILE › REDEMPTION OPTION › CONFIRM › FINISH

REMAINING TOTAL 0 POINTS = $0.00 IN YOUR BEEZAG ACCOUNT

THANK YOU! YOUR CHOSEN AMOUNT HAS BEEN TRANSFERRED TO YOUR PAYPAL ACCOUNT. THIS MAY TAKE UP TO ONE WEEK TO PROCESS. IF YOU HAVE A PROBLEM OR NEED HELP, PLEASE EMAIL US.

JUST REMEMBER, THE MORE VIDEOS YOU VIEW, THE MORE YOU WILL EARN

VIEW MORE VIDEOS          OR BACK TO REDEEM REWARDS PAGE ›

MY BEEZAG

SCOTT
HARROWER ›
EDIT PROFILE

CURRENT
POINTS 27
OFFER LOCKER

2/8 EXPIRING
SOON

VIDEOS

REEDEM REWARDS

HOW TO GET POINTS

INVITE A FRIEND

WHAT I'VE TOLD
BEEZAG

HELP & FAQS

FIG. 16E

```
#include <iostream>
#include "bzChallengeGenerator.h"

using namespace std;

int main(int argc, char* argv[])
{
        bzChallengeGenerator generator;
        generator.ContentType(bzChallengeGenerator::NUMBERS);  // use
        numbers
        generator.ContentDisplaySize(20); // number will be displayed in a 20x20
        pixel square generator.VideoDisplayHeight(240); // video frame height is 240 pixels
        generator.VideoDisplayWidth(320); // video frame width is 320 pixels
        generator.VideoDuration(30); // video playing time is 30 secs bzChallenge c;
        int begin;
        begin = 0;
        cout << "Let's see how many we can randomly generate in sequence" <<
        endl;
        do
        {
                c = generator.Generate(begin);
                cout << c << endl;
                begin = c.Offset() + c.Duration();
        }
        while (begin <= (int)(generator.VideoDuration() -
bzChallengeGenerator::s_contentDuration));
        cout << "Let's generate a challenge for each 10 sec segment" << endl;
        cout << generator.Generate(0, 10) << endl;
        cout << generator.Generate(10, 20) << endl;
        cout << generator.Generate(20, 30) << endl;
        cout << endl << "Press RETURN to continue...";
        char x;
        cin.get(&x, 1);
        return 0;
}
```

FIG. 19A

```
#include <time.h>
#include "bzChallengeGenerator.h"

const char* bzChallengeGenerator::s_content[] =
{
        "0123456789",
        "ABCDEFGHJKLMNPQRTUVWXYZ",  // letters resembling numbers omitted: I O S
        "!@#$%^&*+-"
};
bzChallengeGenerator::bzChallengeGenerator(void)
{
        assert(s_contentDuration > 0);

m_contentType = NUMBERS;
        m_contentDisplaySize = 0;

m_videoDisplayWidth = 0;
        m_videoDisplayHeight = 0;
        m_videoDuration = 0;

// seed the rand() random number generator using the time
        time_t t;
        time(&t);
        srand((int)t);
}
bzChallengeGenerator::~bzChallengeGenerator(void)
{
}
```

FIG. 19B

```
bzChallenge bzChallengeGenerator::Generate(int begin, int end) const
{       begin = (begin < 0) ? 0 : begin;
        assert(begin <= (int)m_videoDuration);
        end = (end < 0) ? m_videoDuration : end;
        assert(end <= (int)m_videoDuration);
        int duration = end - begin;
        // validate parameters
        assert(duration >= s_contentDuration);
        assert(m_videoDisplayWidth >= m_contentDisplaySize);
        assert(m_videoDisplayHeight >= m_contentDisplaySize);
        bzChallenge c;
        int contentLen = strlen(s_content[m_contentType]);
        assert(contentLen > 0);
        // randomly select a character within the content type array
        c.m_content = s_content[m_contentType][RangedRand(0, contentLen - 1)];
        // randomly select an offset between begin and end, allowing time to display
the content
        c.m_offset = RangedRand(begin, end - s_contentDuration);
        // save the duration
        c.m_duration = s_contentDuration;
        // randomly select a horizontal position along the video width allowing space
to display the content
        c.m_xPosition = RangedRand(0, m_videoDisplayWidth -
m_contentDisplaySize);
        // randomly select a vertical position along the video width allowing space to
display the content
        c.m_yPosition = RangedRand(0, m_videoDisplayHeight -
m_contentDisplaySize);;
        return c;
}
int bzChallengeGenerator::RangedRand(int from, int to)
{
        return rand() % (to - from + 1) + from;
}
```

FIG. 19C

```
pragma once
#include <assert.h>
#include "bzChallenge.h"
class bzChallengeGenerator
{
public:
        bzChallengeGenerator(void);
        ~bzChallengeGenerator(void);

enum ContentTypeEnum // type of characters to display
        {
                NUMBERS = 0,
                LETTERS = 1,
                SYMBOLS = 2
        };
        // constant duration to display character during challenge (secs)
        static const unsigned int s_contentDuration = 3;

ContentTypeEnum ContentType() const { return m_contentType; }
        void ContentType(ContentTypeEnum c) { m_contentType = c; } unsigned int ContentDisplaySize() const { return m_contentDisplaySize; }
        void ContentDisplaySize(unsigned int n) { assert(n > 0);
m_contentDisplaySize = n; } unsigned int VideoDisplayWidth() const { return m_videoDisplayWidth; }
        void VideoDisplayWidth(unsigned int n) { assert(n > 0);
m_videoDisplayWidth = n; } unsigned int VideoDisplayHeight() const { return m_videoDisplayHeight; }
        void VideoDisplayHeight(unsigned int n) { assert(n > 0);
m_videoDisplayHeight = n; } unsigned int VideoDuration() const { return m_videoDuration; }
        void VideoDuration(unsigned int n) { assert(n > 0); m_videoDuration = n; }
        // this static method returns a random integer in the close interval [from, to]
        static int RangedRand(int from, int to);
```

FIG. 19D

```
        // this method generates a random challenge given the properties specified
        bzChallenge Generate(int begin = -1, int end = -1) const;
private:
        // content type arrays
        static const char* s_content[];

// type of content to select character from
        ContentTypeEnum m_contentType; // type of characters to display in video
as challenge
        // character display area to be overlaid on image; square in pixels
        unsigned int m_contentDisplaySize; // display area (square) within video
frame to display char, in pixels
        // width of video display area
        unsigned int m_videoDisplayWidth;
        // height of video display area
        unsigned int m_videoDisplayHeight;
        // video's playing time
        unsigned int m_videoDuration;
};
```

FIG. 19E

```
#include "bzChallenge.h"

using namespace std;

std::ostream& operator<<(std::ostream& os, const bzChallenge& c)
{
        os << "Display '" << c.Content() << "' at offset " << c.Offset() << " secs for " << c.Duration() << " secs ";
        os << "at location (" << c.XPosition() << ", " << c.YPosition() << ")";

return os;
} bzChallenge::bzChallenge(void)
{
        m_content = 0;
        m_contentDisplaySize = 0;
        m_offset = 0;
        m_duration = 0;
        m_xPosition = 0;
        m_yPosition = 0;
} bzChallenge::~bzChallenge(void)
{
}
```

FIG. 19F

```
pragma once include <iostream>
//
// This class represents the challenge result returned by the Challenge Generator
//
class bzChallenge
{
friend class bzChallengeGenerator; // only this class can poke values public:
        bzChallenge(void);
        ~bzChallenge(void);

char Content() const { return m_content; }
        unsigned int Offset() const { return m_offset; }
        unsigned int ContentDisplaySize() const { return m_contentDisplaySize; }
}
        unsigned int Duration() const { return m_duration; }
        unsigned int XPosition() const { return m_xPosition; }
        unsigned int YPosition() const { return m_yPosition; } private:
        char m_content;  // content character to display
        unsigned int m_contentDisplaySize; // char display area in pixels (square)
        unsigned int m_offset; // offset in secs into video when to display
        unsigned int m_duration;  // how long to display char
        unsigned int m_xPosition; // pixel position along width
        unsigned int m_yPosition; // pixel position along height
};

std::ostream& operator<<(std::ostream& os, const bzChallenge& c);
```

FIG. 19G

RUN #1

LET'S SEE HOW MANY WE CAN RANDOMLY GENERATE IN SEQUENCE
DISPLAY "3" AT OFFSET 19 SECS FOR 3 SECS AT LOCATION (233, 8)
DISPLAY "2" AT OFFSET 26 SECS FOR 3 SECS AT LOCATION (29, 134)
LET'S GENERATE A CHALLENGE FOR EACH 10 SEC SEGMENT
DISPLAY "7" AT OFFSET 0 SECS FOR 3 SECS AT LOCATION (89, 16)
DISPLAY "2" AT OFFSET 15 SECS FOR 3 SECS AT LOCATION (58, 171)
DISPLAY "9" AT OFFSET 26 SECS FOR 3 SECS AT LOCATION (151, 109)

RUN #2

LET'S SEE HOW MANY WE CAN RANDOMLY GENERATE IN SEQUENCE
DISPLAY "6" AT OFFSET 10 SECS FOR 3 SECS AT LOCATION (60, 90)
DISPLAY "5" AT OFFSET 21 SECS FOR 3 SECS AT LOCATION (108, 116)
DISPLAY "3" AT OFFSET 26 SECS FOR 3 SECS AT LOCATION (274, 215)
LET'S GENERATE A CHALLENGE FOR EACH 10 SEC SEGMENT
DISPLAY "5" AT OFFSET 6 SECS FOR 3 SECS AT LOCATION (36, 119)
DISPLAY "6" AT OFFSET 10 SECS FOR 3 SECS AT LOCATION (150, 220)
DISPLAY "1" AT OFFSET 20 SECS FOR 3 SECS AT LOCATION (11, 43)

VIEW CONFIRMATION FOR ON-DEMAND MULTIMEDIA CONTENT

CROSS REFERENCE TO RELATED APPLICATIONS

This application claims the benefit of provisional patent application No. 61/221,024 titled "View Confirmation For On-Demand Multimedia Content", filed on Jun. 26, 2009 in the United States Patent and Trademark Office.

This application is a continuation-in-part application of the continuation-in-part application Ser. No. 12/544,233 titled "Multimedia Content Viewing Confirmation" filed on Aug. 20, 2009 in the United States Patent and Trademark Office.

The specifications of the above referenced applications are incorporated herein by reference in their entirety.

BACKGROUND

The computer implemented method and system disclosed herein, in general, relates to a viewer response system. More particularly, the computer implemented method and system disclosed herein relates to supplying multimedia content to a client device of a viewer, confirming that the entire multimedia content has been viewed by the viewer, and compensating the viewer for viewing the entire multimedia content.

Media service providers can reach viewers of their media services through a wide spectrum of technologies and devices such as general packet radio service (GPRS), 3G or other internet enabled cellular phones, computers with connection to the internet, and televisions with digital set top boxes. Using this outreach, media service providers earn revenue from product and service companies seeking to advertise their products and services through the media services. However, the efforts of the media service providers to advertise products and services may not achieve optimum results as the viewers may not view or may not be interested in viewing the multimedia content, for example, a video of the advertised products or services. This in turn reduces the outreach of companies seeking to advertise their products and services to potential customers through media services, and may lead to reduced revenue for both the companies that advertise their services through the media service providers, and for the media service providers. In addition, product and service companies cannot confirm whether the viewers viewed the advertisements, since the advertisements are delivered to remote devices. Current viewer measurement systems only provide passive viewer measurement based on whether the advertisement is played on the devices or not, but not based on whether the viewers have attentively viewed the advertisement.

Furthermore, traditional advertising platforms provide an advertiser controlled environment, where the media service providers control which advertisements are distributed to the viewers, at what time, and in what way. Although these advertisements reach out to a wide consumer base, the advertisements are typically irrelevant to the requirements of the viewer. These advertising platforms provide the viewer with little or no options to select the content of the advertisements. Moreover, there is no mechanism to confirm whether the viewer has viewed the advertisements. Traditional advertisements occur in passive form in which viewer interaction with the advertisements is absent. Hence, the viewer may choose to ignore the advertisements or not pay attention to the advertisements. Furthermore, after viewing an advertisement, there is a need for providing the viewer with a means of purchasing a product or service that was advertised.

Therefore, there is a long felt but unresolved need for a computer implemented method and system that enables the media service providers to confirm that a viewer viewed multimedia content such as advertisements on a client device, and encourages the viewer to provide the confirmation that in turn reflects the interest of the viewer in the advertisements. Moreover, there is a need for allowing viewers to select the multimedia content to be viewed based on their preferences and for providing incentives for viewing the selected multimedia content. Furthermore, there is a need for enabling viewers to purchase a product or service by viewing the multimedia content.

SUMMARY OF THE INVENTION

This summary is provided to introduce a selection of concepts in a simplified form that are further described in the detailed description of the invention. This summary is not intended to identify key or essential inventive concepts of the claimed subject matter, nor is it intended for determining the scope of the claimed subject matter.

The computer implemented method and system disclosed herein addresses the above stated need for confirming that a viewer viewed the entire multimedia content on a client device, and for providing an incentive to the viewer to view the entire multimedia content. The computer implemented method and system can be used for confirming that a viewer viewed the entire multimedia content that is, for example, commercial, educational, and entertaining in nature.

The computer implemented method and system disclosed herein provides controlled access of the multimedia content to the viewer using viewer credentials. The viewer provides information, for example, personal information, marketing information, credit worthiness of the viewer, etc. to create a viewer account on a server. The server creates the viewer account for the viewer and generates the viewer credentials. The viewer accesses the server by supplying the generated viewer credentials.

In the computer implemented method and system disclosed herein, viewing of the multimedia content is confirmed using a challenge-response mechanism. The multimedia content for viewing is, for example, available as streaming content or downloaded content and comprises content on demand. A multimedia content owner, for example, an advertiser, uploads multimedia content on a server administered by a media service provider. The client device of a viewer receives the multimedia content, for example, an advertisement, a commercial message, an educational clip, an entertainment clip, etc., from the server and plays the multimedia content on a display screen of the client device, for example, in an audiovisual format. As used herein, the client device is, for example, an internet enabled mobile device, a computer with a web browser, a tablet computing device, a set top box capable of delivering interactive multimedia content, an internet protocol enabled device on an internet connection, etc. The client device is capable of receiving the multimedia content in different multimedia content formats, for example, hypertext markup language 5 (HTML5) format, Windows® audio video format and other proprietary and non-proprietary formats.

The server transmits a list of multimedia content and viewing parameters to the client device, on demand for selection, by the viewer. The server transmits a list of the multimedia content preselected by the viewer and/or based on preferences selected by the viewer. The viewer receives the list of multimedia content on the client device from the server for selection. The viewer selects one or more of the multimedia content from the list of multimedia content. The viewer also selects one or more viewing parameters. As used herein, the term "viewing parameters" refers to parameters that can be selected by a viewer. For example, the viewer can select viewing parameters such as a schedule, an order of playing the selected multimedia content, etc. The server streams or transmits the selected multimedia content to the client device for enabling the viewer to view the selected multimedia content in real time or at a later time selected by the viewer. In an embodiment, the server transmits the selected multimedia content from a location referenced by a multimedia content owner. In another embodiment, the server transmits the selected multimedia content to an intermediate system. The intermediate system transmits the selected multimedia content to the client device at predetermined intervals of time. In another embodiment, the selected multimedia content is downloaded to the client device and stored for later viewing. In another embodiment, the server sends an encrypted key to the client device to enable the multimedia content to be viewed at a later time, for example, in an offline mode. The client device receives and plays the selected multimedia content based on the selected viewing parameters.

Viewing of the selected multimedia content by the viewer is confirmed using, for example, a random challenge. In an embodiment, the random challenge is presented to the viewer by overlaying the random challenge on the selected multimedia content. The random challenge is one or more of random in content, presented at random times during and/or after the play of the selected multimedia content and presented at random physical locations on the selected multimedia content. The random challenge comprises, for example, one or more of a random number, a random icon, a random shape, a product logo, a service logo, a random color, a random mathematical equation, and a random target on the display screen of the client device for the viewer to interact therewith using touch or a pointing device. In an embodiment, the random challenge content is unrelated to the multimedia content. The random challenge changes for each multimedia content viewing. The random challenge is presented at one or more times during and/or after the multimedia content is played. The duration of play of the multimedia content is determined and the random challenge is presented during and/or after the play duration of the multimedia content.

One or more responses are invoked from the viewer for one or more presented random challenges. The response determines whether the viewer has viewed the multimedia content. If one or more of the responses entered by the viewer for the presented one or more random challenges is correct, the response confirms that the multimedia content has been viewed by the viewer. The presentation of the random challenge to the viewer may be repeated if the response from the viewer to the presented random challenge is incorrect.

In another embodiment, the random challenge is presented by interrupting the play of the selected multimedia content after an interrupt time period. The interrupt time period is less than duration of the multimedia content. A timer is provided to begin counting the interrupt time period at the start of the play of the multimedia content. When the timer reaches the interrupt time period, the play of the multimedia content is interrupted to present the random challenge to the viewer.

The random challenge is presented in different forms such as a visual overlay on the multimedia content, or a child window cascading with the content rendering window, or parent window. For example, the random challenge comprises one or more random numbers presented at different points in time when the multimedia content is being played. The correct response in this example comprises reproduction of the random numbers by entering the random numbers into the client device. In an embodiment, the random challenge comprises, for example, a random pair of geometrical shapes, a random mathematical equation, a random icon, a product logo or a service logo, a color, a target on a touch screen, etc. overlaid at random physical positions on the multimedia content. The correct response may comprise a selection of an option representing a pair of geometrical shapes from an options list, entering the result of the mathematical equation into the client device, selection of an option representing an icon from an options list, selection of an option representing a product logo or a service logo from an options list, selection of an option representing a color from an options list, selection of or interaction with a target or response region on a touch screen, etc. respectively. In another embodiment, one or more random challenges are presented at different time intervals during the play of the multimedia content or at the conclusion of the play of the multimedia content.

The random challenge appears randomly on a multimedia player frame within the display screen of the client device. For example, the random challenge appears randomly on any four corners of the multimedia player frame. The random challenge also appears at a number of unique positions within the multimedia player frame based on physical coordinates selected within the multimedia player frame. The random challenge may also appear immediately outside a boundary of the multimedia player frame and scrolls in an upward direction or a downward direction on either side of the multimedia player frame. The random challenge also scrolls in a rightward direction or a leftward direction above or below the multimedia player frame.

A response for a random challenge is deemed correct, that is, viewing of the multimedia content is confirmed, if the viewer provides the response within a response time-out period after the random challenge is presented. For example, a timer is provided to determine the time lapsed between the presentation of the random challenge and the submission of the response on the client device.

The response for a random challenge is invoked at any time during and/or after the multimedia content is played. For example, the viewer may be prompted to enter a response to the random challenge during the play of the multimedia content, or during and at the end of the play of the multimedia content, or after the multimedia content is played. A response report is generated based on the response from the viewer. The generated response report is transmitted to the server for confirming that the multimedia content has been viewed. In an embodiment, the response report is generated on the server. The viewer is compensated by crediting the viewer with one or more items of value if the response report confirms that the viewer has viewed the multimedia content and has provided a correct response to the presented random challenge. The items of value comprise, for example, one or more of points, points redeemable for cash, points redeemable for an item of value, scores, scores redeemable for cash, scores redeemable for an item of value, cash, viewing of premium content, units of virtual currency, and any combination thereof.

In an embodiment, the client device downloads and stores the selected multimedia content when the client device is connected to the server. In this embodiment, when the connection to the server is inactive, the client device renders the downloaded multimedia content in an off-line mode, performs a challenge-response interaction with the viewer, and generates and stores the response report. The off-line mode is triggered when the connection to the server is inactive. When a connection to the server is established via, for example, satellite, a wireless network, the internet, etc., the response report is transmitted to the server over the connection. In another embodiment, the client device renders the multimedia content transmitted by the server as streaming multimedia content. In this embodiment, when the connection to the server is active, the client device renders the multimedia content in an online mode and performs a challenge-response interaction with the viewer. The response report generated after completing the challenge-response interaction is transmitted to the server over the active connection.

In an embodiment, the viewer is credited with an item of value, for example, cash, if the response report confirms the multimedia content was viewed by the viewer, and the multimedia content owner is debited a fee. When the viewer successfully responds to one or more of the random challenges, the correct or partially correct response to the random challenge indicates a confirmation that the multimedia content has been viewed. In an embodiment, the viewer is eligible for an item of value even when one or more responses entered by the viewer are incorrect. In another embodiment, the viewer is eligible for an item of value for each correct response to a random challenge presented. Offering an item of value for a confirmed view provides an incentive to the viewer to view the entire multimedia content and respond to the random challenge presented during and/or after the play of the multimedia content. In another embodiment, the incentive is in the form of a redeemable credit score accumulated by the viewer over time. The credit score is redeemed, for example, with money, gifts, or any other item of value. The server is configured to receive the response report sent by the client device, and directs a payment module to credit the viewer account, for example, with a predetermined amount of money for a confirmed viewing of the multimedia content.

In another embodiment, the viewer is provided with an electronic wallet (e-wallet) associated with the viewer account for accruing the items of value over a period of time. The viewer is compensated by depositing the items of value into the e-wallet and debiting a fee from, for example, the multimedia content owner, if the response report confirms that the selected multimedia content was viewed by the viewer. In an embodiment, the server provides the viewer with an option of triggering playback of premium multimedia content in exchange for the items of value accrued in the electronic wallet and allows the premium multimedia content to play. In an embodiment, the viewer can purchase products and services on an electronic commerce (e-commerce) platform using the items of value accrued in the e-wallet.

In another embodiment, the server inserts an interactive promotional segment within the selected multimedia content. The interactive promotional segment directs the viewer to an e-commerce platform for enabling the viewer to purchase products and services on the e-commerce platform. The server may also promote viewing of the multimedia content.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and instrumentalities disclosed herein.

FIGS. 13A-13E exemplarily illustrate screenshots for registering a viewer with the server.

FIGS. 14A-14B exemplarily illustrate screenshots for creating a profile by the viewer on the server.

FIGS. 15A-15C exemplarily illustrate screenshots for a viewing a video and confirming viewing of the video using a random challenge.

FIGS. 16A-16E exemplarily illustrate screenshots of compensations accumulated and redeemed by the viewer.

FIGS. 19A-19G exemplarily illustrate a C++ implementation of a challenge generator.

FIG. 20 exemplarily illustrate a sample output after executing test cases established for the challenge generator.

DETAILED DESCRIPTION OF THE INVENTION

Figure 1:
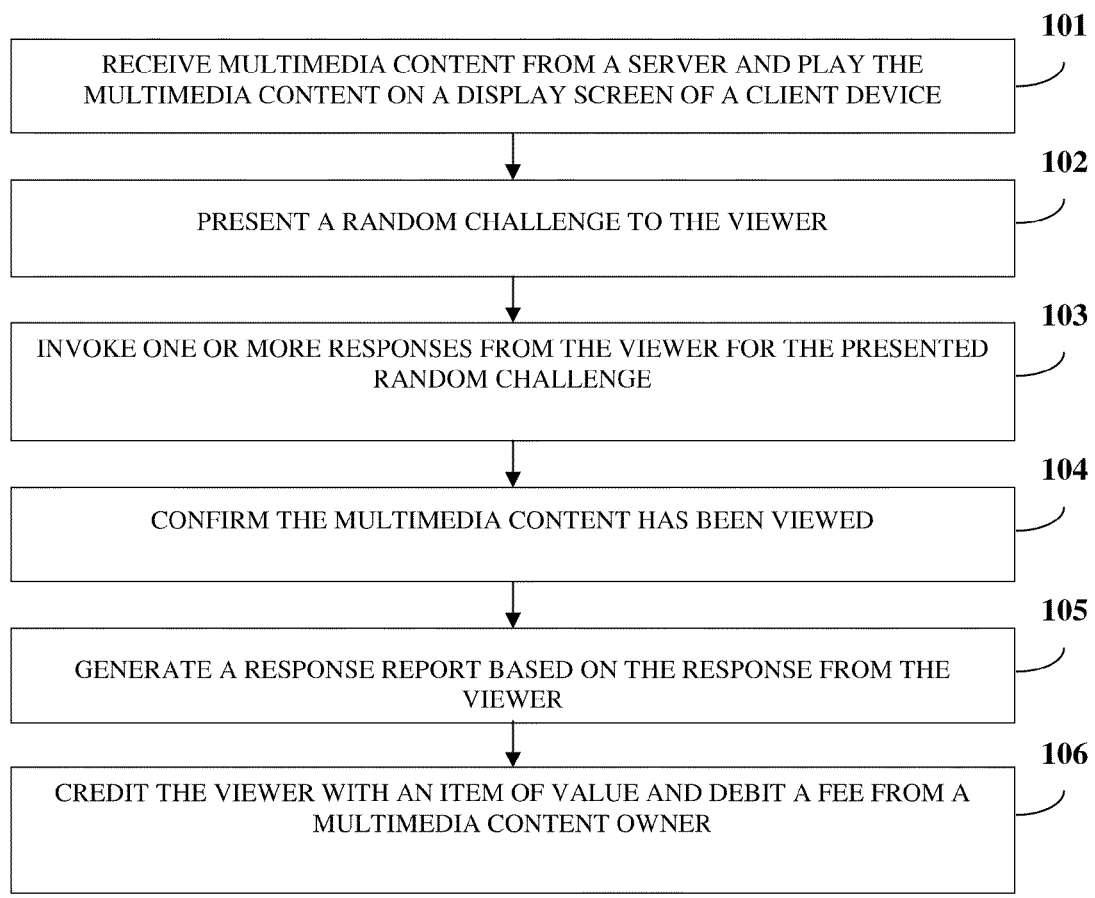
FIG. 1 illustrates a first embodiment of a computer implemented method for confirming that a viewer viewed multimedia content on a client device.

FIG. 1 illustrates a first embodiment of a computer implemented method for confirming that a viewer viewed multimedia content on a client device. As used herein, the term "multimedia content" refers to content in different combined and individual formats, for example, text, audio, video, audio-visual formats, still images, animations, and rich content formats. The multimedia content for viewing is, for example, available as streaming content or downloaded content and comprises content on demand. In an embodiment, the multimedia content is provided from a predetermined list compiled from a database of a server driven by the preselected preferences of the viewer. As used herein, the term "viewer" refers to any user of a client device who accesses the server for registration and for viewing of multimedia content. The computer implemented method and system 500 disclosed herein is used for promoting the viewing of multimedia content, for example, an advertisement clip of a product by providing an incentive to the viewer to view the multimedia content. The computer implemented system 500 disclosed herein is exemplarily illustrated in FIG. 5. The computer implemented method and system 500 can be used, in general, for confirming that the viewer has viewed the multimedia content that is commercial, educational, and entertaining in nature.

In the computer implemented method disclosed herein, viewing of the multimedia content is confirmed using a challenge-response mechanism that requires active input actions from the viewer. The challenge-response is incorporated within the multimedia content available for consumption by the viewer on a client device 501 capable of connecting to a network 503 and capable of rendering multimedia content formats.

Figure 5:
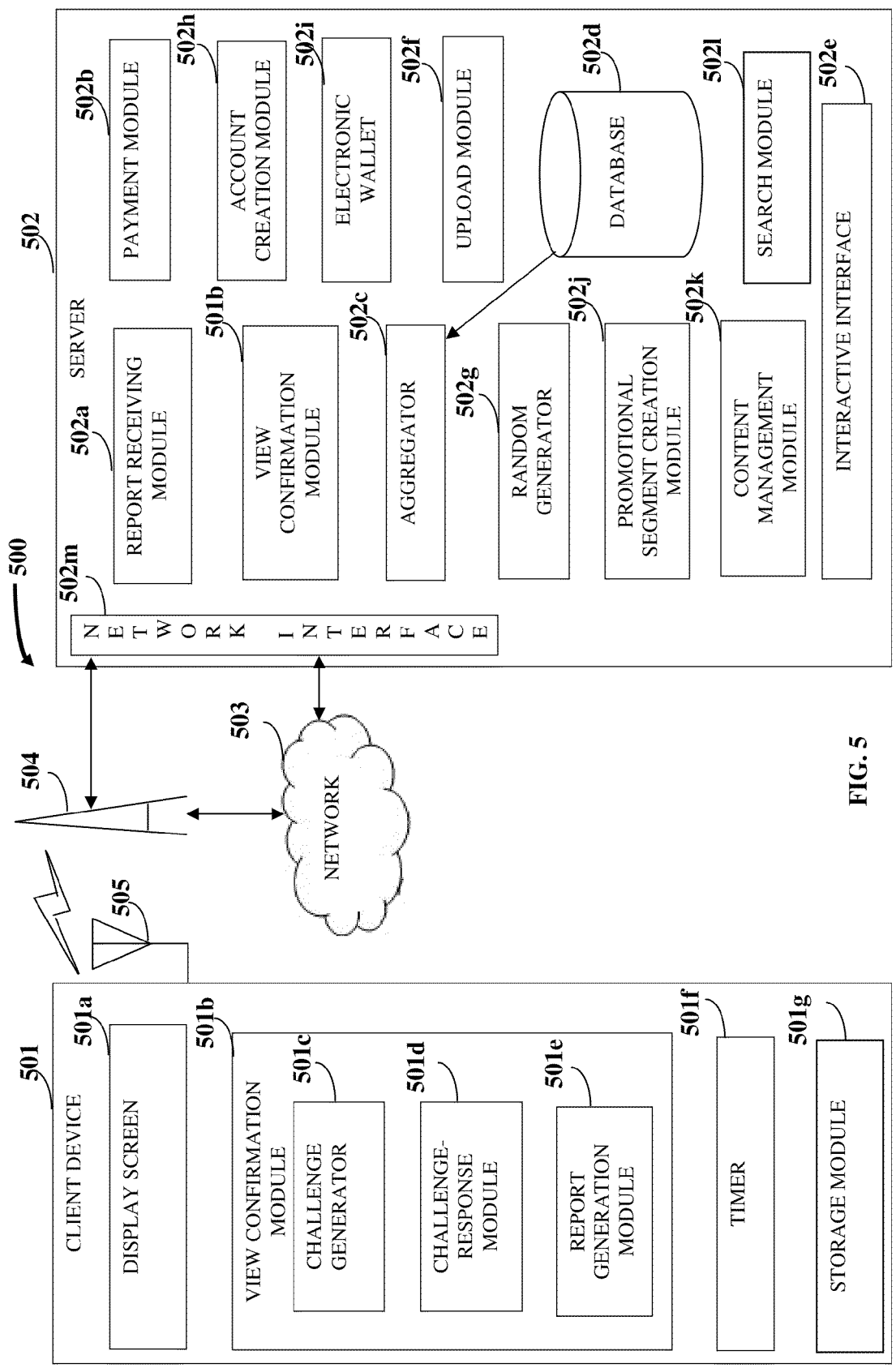
FIG. 5 illustrates a computer implemented system for confirming that a viewer viewed multimedia content on a client device.

The client device 501 possessed by the viewer is capable of establishing a client-server relationship with the server 502 via the network 503 as illustrated in FIG. 5. The client device 501 may also download a client software module, for example, a view confirmation module 501b over the network 503 for making service requests to the server 502, while the server 502 addresses the service requests. The network 503 is, for example, a cellular network, the internet, a local area network, or any other network established using available networking protocols.

A multimedia content owner, for example, an advertiser, uploads multimedia content, for example, an advertisement, a commercial message, an educational clip, an entertainment clip, etc. on the server 502 of a media service provider. As used herein, "multimedia content owner" refers to an entity that generates multimedia content. Also, as used herein, "media service provider" refers to a service entity that provides the service of confirming that a viewer has viewed multimedia content uploaded or referenced by the multimedia content owner on the server 502. The client device 501 of the viewer receives 101 the multimedia content from the server 502 and plays the multimedia content on a display screen 501a of the client device 501, for example, in an audiovisual format. As used herein, the client device 501 refers to, for example, an internet enabled mobile device, a computer with a web browser, and a set top box capable of delivering interactive multimedia content, etc. The client device 501 is capable of receiving the multimedia content in different multimedia content formats, for example, hypertext markup language 5 (HTML5) format, Windows® audio video format, and other proprietary and non-proprietary formats. A random challenge is presented 102 to the viewer by overlaying the random challenge on the multimedia content. The random challenge comprises, for example, one or more of a random number, a random icon, a random shape, a product logo, a service logo, a random color, a random mathematical equation, and a random target on the display screen 501a of the client device 501 for the viewer to interact therewith using touch or a pointing device. The random challenge is overlaid at different positions on the multimedia content. The random challenge is overlaid using technologies, for example, hypertext markup language (HTML5), Adobe®Flash or other video creation standards. The streams comprising the random challenge and the multimedia content are integrated at either the server 502 or combined at a web browser on the client device 501 of the viewer. The random challenge and the multimedia content may arrive at the client device 501 of the viewer as a single integrated stream or as two independent streams that are combined in real time at the client device 501.

The content of the random challenge is, for example, numbers, letters, shapes, phrases, etc., from a predefined set. The random challenge is one or more of random in content, presented at random times during and/or after the play of the multimedia content, and presented at random physical locations on the multimedia content. In an embodiment, the random challenge content is unrelated to the multimedia content.

In another embodiment, the multimedia content is transmitted independently of the random challenge, that is, a multimedia content file may not be accompanied by a particular random challenge. In this case, the random challenge may be randomly selected from a set of random challenge files and then overlaid on the multimedia content. Moreover, the same random challenge can be reused with different multimedia content files. Furthermore, the random challenge and the multimedia content may be interchangeably used with other multimedia content and random challenges respectively.

In an embodiment, the challenge is a pseudorandom challenge. A pseudorandom challenge involves the random selection of a limited set of challenge icons from a fixed data set, displayed at random times with certain defined boundaries, and at random physical placements within a display screen 501a. For example, the pseudorandom challenge involves a random selection of a number between 0 and 9; a random selection of a shape among, for example, a circle, a square, a triangle; a random selection of a letter within the alphabet, etc. Furthermore, the pseudorandom challenge comprises random placement of the randomly selected content, both in terms of time and space within the multimedia content. The pseudorandom placement of the challenge can define time boundaries. For example, a first challenge occurs between second "X" and second "Y" of the multimedia content selected for play, while a second challenge occurs within 10 seconds of the end of the play. The two-dimensional space defined by the display screen 501a within which the challenge occurs can also be pseudorandom within fixed parameters. For example, the pseudorandom challenge appears in one of the four corners of the display screen 501a, each time a pseudorandom challenge is displayed, at a pseudorandom time.

In an embodiment, the randomness of the challenge content for space is implemented as follows. The placement of the challenge is made random by overlaying the challenge content at different locations in or around the multimedia content. The purpose of randomizing the placement of the challenge content is to prevent, for example, "ad blindness". "Ad blindness" as used herein results when the viewer focuses on a single physical spot within a multimedia player frame 1202 exemplarily illustrated in FIG. 12. As used herein, the multimedia player frame 1202 is a graphical output component of any media player application that plays the multimedia content in a defined region within the display screen 501a of the client device 501 as exemplarily illustrated in FIG. 12. The random challenge appears randomly on the multimedia player frame 1202 within the display screen 501a of the client device 501. In an example, a challenge icon flashes randomly within one of the four corners of the multimedia player frame 1202 when a video is played. The viewer is encouraged to watch the entire video and not focus solely on a single physical spot within the video, since the location of the challenge icon is random. This allows the viewer to more completely view the content of the video to absorb the content of the video being played amidst the challenge-response interaction.

Figure 12:
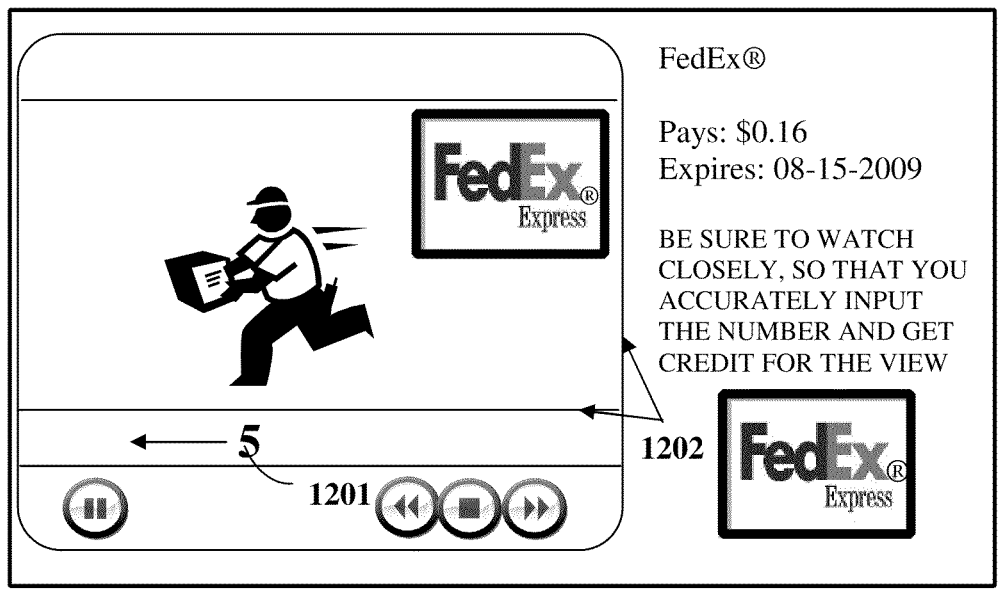
FIG. 12 exemplarily illustrate a screenshot for a scrolling random challenge.

In another example, the random challenge appears immediately outside a boundary of the multimedia player frame 1202. The challenge icon, for example, scrolls in an upward direction or a downward direction on either side of the video immediately outside the boundary of the actual multimedia player frame 1202, or scrolls in a rightward direction or a leftward direction of the multimedia player frame 1202 in a region above or below the video, as exemplarily illustrated in FIG. 12. FIG. 12 exemplarily illustrates a screenshot for a scrolling random challenge icon, for example, the numeral "5" 1201 moving in a leftward direction below the video. The directions in which the challenge icon scrolls as well as the position of the challenge icon relative to the multimedia player frame 1202 are random. For example, the challenge icon scrolls vertically up or vertically down in a region immediately left of the multimedia player frame 1202. In another example, the challenge icon scrolls horizontally right or left in a region immediately above the multimedia player frame 1202. The viewer is therefore required to watch the entire multimedia player frame 1202 in order to respond to the challenge icon. In another embodiment, the challenge icon scrolls diagonally within the multimedia player frame 1202 from one corner to the other.

In another example, the challenge icon is randomly displayed at any location within the multimedia player frame 1202. Physical coordinates, for example, X and Y coordinates for display of the challenge icon within the multimedia player frame 1202 are randomly selected by a challenge generator 501*c* of the view confirmation module 501*b*. In this manner, the challenge icon can appear at a number of unique positions in the multimedia player frame 1202 depending on the possible combinations of the X and Y coordinates selected within the multimedia player frame 1202.

In an embodiment, the client device 501 receives a list of multimedia content from the server 502 for selection by the viewer. The multimedia content selected by the viewer is rendered on the display screen 501*a* of the client device 501, and the duration of play of the selected multimedia content is determined. A random challenge may be randomly selected from a set of random challenge files stored in the database 502*d* and then presented at one or more points in time by overlaying the random challenge on the selected multimedia content. For example, the random challenge is presented for N seconds, after L seconds elapse with an audio-video clip of duration M seconds, wherein L is less than M. The random challenge is presented at one or more times during and/or after the multimedia content is played. The random challenge changes for each multimedia content viewing.

One or more responses are invoked 103 from the viewer for the presented random challenge. A response may be invoked from the viewer during or at the end of play of the multimedia content. The response entered by the viewer determines whether the viewer has viewed the multimedia content. The response is used for confirming 104 the viewing of the multimedia content. The viewer may enter a response to the random challenge during the play of the multimedia content, and optionally during and after the multimedia play, and optionally after the multimedia play. A response report is generated 105 based on the response from the viewer. The response report verifies the correctness of the response to the random challenge entered by the viewer and confirms viewing of the multimedia content. The generated response report is transmitted to the server 502 confirming that the multimedia content has been viewed by the viewer. In an embodiment, the response report is generated on the server 502.

In an embodiment, the presentation of the random challenge to the viewer is repeated if the response from the viewer for the presented random challenge is incorrect. The steps of rendering the viewer selected multimedia content, presenting a random challenge, invoking a response, and generating a response report may be repeated for other multimedia content in the list depending on the selection of the viewer.

The random challenge is presented in different forms, for example, a visual overlay on the multimedia content, or a child window cascading with the content rendering window. For example, the random challenge is presented as a graphical user interface (GUI) widget. In another example, the random challenge is a short audio message introduced briefly into the visual-only media content. The randomness in the challenges is due to the randomness in visual elements presented in the challenges as well as the responses that the challenges elicit during or after the multimedia content is played. For example, the random challenge comprises one or more random numbers flashed at different points in time when a multimedia content is being played. The correct response in this example comprises reproduction of the random numbers by entering the random numbers into the client device 501. The response is verified by comparing the numbers entered by the viewer with the numbers flashed in the multimedia content. The random challenge further comprises, for example, one or more random geometrical shapes presented at different points in time, a random mathematical equation, a random icon, a product logo or a service logo, a color, a target on a touch-sensitive screen that the viewer has to touch, a target that is pointed at by a pointing device, etc. In these examples, the correct response comprises a selection of an option representing the geometrical shapes from an options list, entering the result of the mathematical equation into the client device 501, selection of an option representing an icon from an options list, selection of an option representing a product logo or a service logo from an options list, selection of an option representing a color from an option list, selection or interaction with the target on a touch-sensitive screen, etc., respectively.

In an embodiment, one or more random challenges are presented at one or more times or at different time periods, during or after the multimedia content is played. For example, the first challenge is presented half way through the play of a multimedia clip and the second challenge is presented at the end of the multimedia clip.

The viewer is requested to provide a response to the random challenge on the client device 501 within a predetermined period of time, after the random challenge is presented. A response for a random challenge is deemed valid if the viewer provides the correct response within a response timeout period, after the random challenge is presented. A timer 501*f* is provided to determine the time lapsed between the presentation of the random challenge and the submission of the response.

In an embodiment, the viewer is credited 106 with an item of value, for example, cash, if the response report confirms the multimedia content has been viewed by the viewer, while the multimedia content owner is debited a fee for the service provided to the multimedia content owner by the media service provider. Furthermore, the viewer is credited with an item of value if the response report verifies that the response to the random challenge entered by the viewer is correct. When the viewer's response to the random challenge is correct or partially correct where more than one random challenge is presented to the viewer, the correct response to the random challenge confirms that the multimedia content was viewed. In an embodiment, the viewer is optionally eligible for an item of value even when one or more responses entered by the viewer are incorrect. In an embodiment, where the number of random challenges presented is more than one, the viewer is eligible for an item of value for each correct response.

Compensating the multimedia content viewer with an item of value for a confirmed view provides an incentive to the viewer to view the entire multimedia content and respond to the random challenge that is presented during or after the play of the multimedia content. For example, offering an incentive to answer the random challenge presented within an advertisement clip generates interest in a potential buyer to view the entire advertisement clip, thereby promoting the service or product advertised in the multimedia content. In an embodiment, the incentive is in the form of a redeemable credit score accumulated by the viewer over time. The credit score is redeemed with, for example, money, gifts, or any other items. The server 502 is configured to receive the response report sent by the client device 501, and directs a payment module 502b to credit an account of the viewer with an item of value, for example, a predetermined amount of money for the confirmed view. In an embodiment, the response report is generated at the server 502.

The response for a random challenge is invoked at any random point in time during or after the multimedia content is played. For example, the viewer is prompted to enter a response to the random challenge at the end of the duration of the multimedia content. The random challenge may appear once or multiple times when the multimedia content is played on the viewer's client device 501. The viewer may be prompted to respond to the random challenge either during or immediately following the completion of the multimedia content. In an example, the multimedia content is an audio-video file with a duration of 20 seconds. During the playing of the video, the numerals 7 and 9 are each flashed for 2 seconds, for example, at the $10^{th}$ and $15^{th}$ second respectively, after the start of the play of the video for the observation of the viewer. At the completion of the audio-video file, an answer box appears prompting the viewer to enter the numbers flashed during the audio-video, in order to register a correct response and therefore a confirmation of the view.

In another example, a video is played to the viewer, during which a pair of geometrical shapes, for example, a circle followed by a square appear in subsequent frames of the video. The geometrical shapes are overlaid at random positions on the video and appear independent of the video, or appear as part of the video. At the completion of the video, a pull down answer menu appears with several shape pairs as options. The viewer selects the correct shape pair from the options in the menu to register a correct response. In another example, a video is played in the primary window of the user interface and a child window appears either cascaded with or alongside the parent window. The companion window displays a mathematical equation, such as (3+3=?), as the challenge. The video is paused momentarily or for a response time-out period within which the viewer is required to enter the correct answer, in this case 6. In an embodiment, the viewer is required to submit the correct response in order to resume playing of the video, or avoid termination of the video. In another example, a color is flashed in the foreground or the background when the video clip is being played. The viewer is required to either enter a description of the color or select the color from an options list to register a correct response.

In an embodiment, the random challenge comprises a target or a response region that appears on a touch-sensitive screen of, for example, an iPhone® or an iPad® of Apple Inc., an Android implemented device or other touch-sensitive internet connected devices. The target or the response region appears on the touch-sensitive screen during the playing of a video. As used herein, the target or the response region is a viewer selectable area, randomly overlaid during the play of the multimedia content, with which the viewer interacts within a response time out period to register a valid response. The response is invoked in real-time and involves the viewer, for example, touching a region on the touch-sensitive screen where the target or the response region appears. For example, a commercial on baseball is displayed on the touch-sensitive screen. During the play of the commercial, various baseball team logos are randomly displayed, each for 2 to 3 seconds.

The viewer can confirm viewing of the commercial by touching the touch-sensitive screen when and where the logos appear. In an embodiment, the challenge and response interactions are implemented using GUI widgets. The challenge presented to the viewer is to pinpoint a position on the parent window where a child window, such as modal window, appears at a random position during the playing of the video in the parent window. A modal window is a child window that requires the viewer to interact with the child window before the viewer can return to the flow of the parent window. The challenge further comprises selecting the pinpointed position within a response time-out period. The selection of the pinpointed position is performed, for example, using a touch stylus on a touch-sensitive screen, or using a pointing device and a corresponding pointer on the display screen 501a. In this example, the user interface is a touch-sensitive screen or a pointing device in conjunction with a regular screen, respectively. The child window presenting the challenge may comprise a button that has to be selected by the viewer within the response time-out period to register a valid response.

In another example, the viewer is required to complete more than one challenge-response interaction, that is, locate and select more than one random target or response region at different time periods, during the play of a video. For example, during the playing of a video in the parent window, a first button appears for 5 seconds at halfway through the video, while a second button appears for 5 seconds at the end of the video. The viewer is required to locate and select both the buttons within the relevant response time-out periods to register a valid response. If the viewer has not correctly selected either of the targets or both the targets within the relevant response time-out periods, the viewer is prompted to replay the video and complete the challenge. In another example, the targets or the response regions, for example, one or more buttons appear immediately outside the boundary of the multimedia player frame 1202, during the play of a video. The viewer is required to locate and select the buttons within the relevant response time-out periods to register a valid response.

In an embodiment, the random challenge content is either visual or aural. In case of the random challenge being aural, the random challenge content is in a non-visual alphanumeric form. If the random challenge content is aural in nature, the random challenge content is, for example, alphanumeric or indicative of a logo, icon, symbol, shape, picture, etc. If the random challenge content is visual, the random challenge content is, for example, in the form of a logo, icon, symbol, shape, picture, etc. The response for the random challenge requires the viewer to enter the random challenge content, or to select the correct option from the presented options. The response can also be registered manually or orally. For example, the viewer has to perform a manual action such as depressing a button, operating a pointing device or touching a screen, or utter words or sounds to register a response.

Consider an example where the challenge content is visually presented to the viewer. The challenge content, for example, a logo, an icon, a symbol, a shape, a picture, etc. is displayed for 5 seconds within a first child window during the play of an advertisement in a parent window or content rendering window. A second child window displays a message or a prompt such as "Provide the symbol above at the end of the advertisement" or "Select the symbol previously displayed". Consider another example where the challenge content is aurally presented to the viewer during the play of an advertisement. A speech synthesizer provides an audible sound indicative of the challenge content, and also prompts the viewer to remember and submit the challenge content at the end of the advertisement, for example, "Enter the two digits that you heard". The viewer submits the response by selecting the correct option indicative of the challenge content presented. The viewer also submits the response by depressing the appropriate alphanumeric keys of the input means of the client device 501. In another example, the viewer submits the response by uttering or orally articulating the challenge content, which is processed by suitable voice recognition software in the client device 501 or the server 502. In an embodiment, the viewer is required to submit the correct response within a time-out period.

In the event that the viewer enters an incorrect response, or enters the response after the elapse of the response time-out period, a challenge-response module 501d of the view confirmation module 501b displays an error message or a prompt message, prompting the viewer to restart or replay the multimedia content. For example, the prompt message: "You have not entered the required digits in the time allocated, or you have entered the incorrect digits. Would you like to replay the advertisement?" is displayed, inviting the viewer to select either a "Yes" option or a "No" option. If the viewer chooses to replay the multimedia content, the multimedia content is replayed and the procedure is repeated with another challenge-response sequence. If the viewer chooses not to replay the multimedia content, the response report is generated indicating the incorrect response in the previous attempt, and the play of the multimedia content is terminated.

Figure 2:
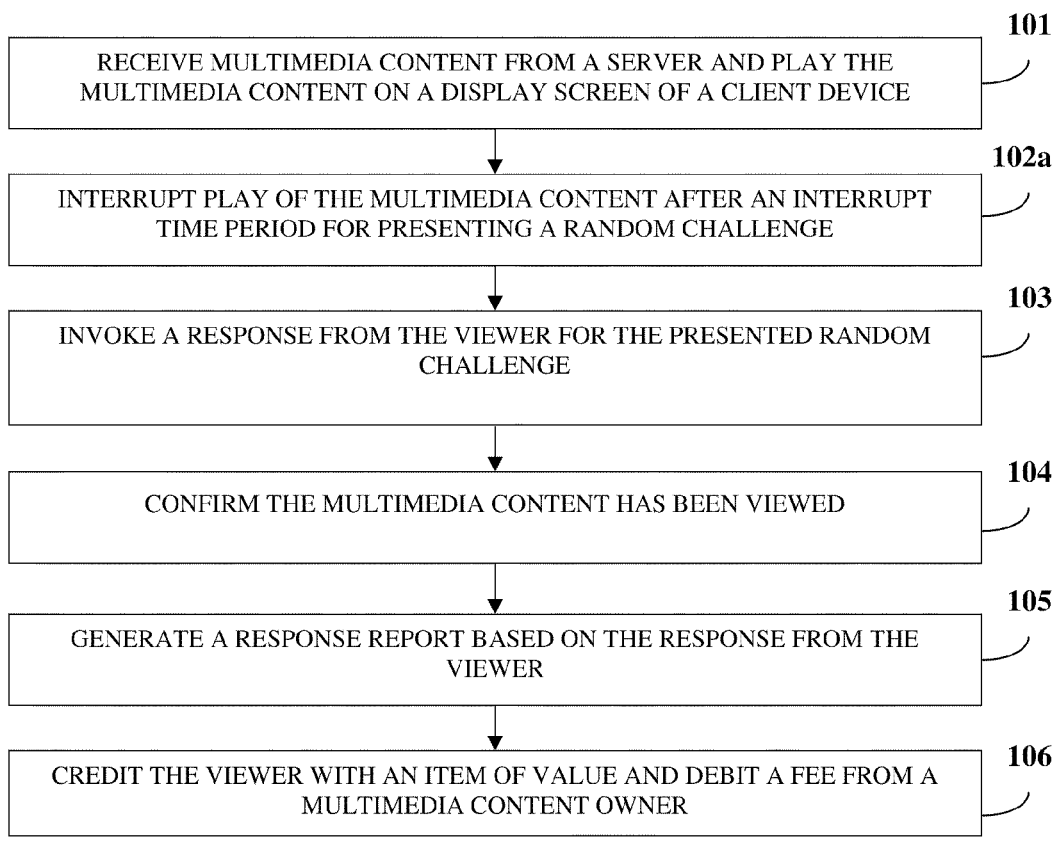
FIG. 2 illustrates a second embodiment of the computer implemented method for confirming that a viewer viewed multimedia content on a client device.

FIG. 2 illustrates a second embodiment of the computer implemented method for confirming that a viewer viewed multimedia content on a client device 501. One or more multimedia content owners upload multimedia content on the server 502 of the media service provider. In another embodiment, the multimedia content owners upload multimedia content on, for example, a third party content server, a network of servers, servers that belong to the multimedia content owners, etc. In this embodiment, the multimedia content owner transmits, for example, a tag or a reference to the location of the uploaded multimedia content to the media service provider administering the server 502. The media service provider then invokes transmission of the multimedia content to the viewer from the tagged or referenced location, for example, from the third party content server. The media service provided invokes a real time transmission of the multimedia content to the viewer via, for example, the third party content server by delivering browser executable code such as JavaScript code to a web browser on the viewer's client device 501. The viewer's web browser automatically executes the JavaScript code, fetches the multimedia content from the referenced location, and displays the multimedia content to the viewer.

The client device 501 of the viewer receives 101 the multimedia content, for example, an advertisement, a commercial message, an educational clip, an entertainment clip, etc. from the server 502 and plays the multimedia content on the display screen 501a of the client device 501, for example, in an audiovisual format. The play of the multimedia content is interrupted 102a after an interrupt time period for presenting a random challenge. The interrupt time period is less than the duration of the multimedia content. The random challenge content is generated and displayed at random on the multimedia content. In another embodiment, the random challenge is presented to the viewer by overlaying the random challenge on the multimedia content as the multimedia content is playing on the display screen 501a of the client device 501 as disclosed in the detailed description of FIG. 1. In this embodiment, the random challenge is overlaid or played on the multimedia content or in close proximity to the multimedia content. A response is invoked 103 from the viewer for the presented random challenge. The response entered by the viewer determines whether the viewer has viewed the multimedia content. The response is used for confirming 104 the viewing of the multimedia content. A response report is generated 105 based on the response from the viewer. The response report verifies the correctness of the response to the random challenge and confirms viewing of the multimedia content by the viewer. The viewer is credited 106 with an item of value, if the response report confirms the multimedia content was viewed by the viewer, while the multimedia content owner is debited a fee. In an embodiment, the viewer is credited only for the correct responses provided by the viewer and verified by the response report.

In an embodiment, the item of value provided to the viewer is the ability to view premium multimedia content, for example, a sports broadcast, a movie, a television show, etc. In this embodiment, the multimedia content owner is debited a fee similar in value to the value of the premium multimedia content. In an embodiment, the amount by which the multimedia content owner's debited fee exceeds the item of value credited to the viewer is retained by the media service provider as profit. In another embodiment, the media service provider administering the server 502 credits the viewer with items of value based on the response report confirming that the viewer provided correct responses to the random challenges.

In an embodiment, the items of value earned by the viewer are a number of units of virtual currency similar to, for example, frequent flyer miles earned in the airline industry. The viewer may exchange the number of units of virtual currency at a future time for rewards such as viewing premium multimedia content, cash, etc. The use of the virtual currency embodiment allows the value earning process and the value redemption process to be separated over time across hours, days, weeks, and so on. In the intervening time, the number of units of virtual currency earned by the viewer is accumulated in an electronic wallet (e-wallet) 502i associated with a viewer account on the server 502 or with any other third party trusted by the media service provider and the viewer.

If the viewer provides incorrect responses to the server 502 or provides a response after an elapsed response time-out period, the challenge-response module 501d prompts the viewer to restart or replay the multimedia content. If the viewer chooses to replay the multimedia content, the multimedia content is replayed and another random challenge is presented to the viewer. If the viewer chooses not to replay the multimedia content, the response report is generated indicating the incorrect responses provided by the viewer in the previous attempt, and the play of the multimedia content is terminated. The viewer is compensated for only the correct responses as indicated by the response report confirming viewing of the multimedia content.

In an embodiment, the client device 501 receives a list of multimedia content from the server 502 for selection by the viewer as disclosed in the detailed description of FIG. 1. The multimedia content selected by the viewer is rendered on the client device 501 and the duration of the selected multimedia content is determined. The rendering of the multimedia content is interrupted after an interrupt time period for presenting a random challenge. The interrupt time period is less than the duration of the rendered multimedia content. For example, an audio-video clip of duration M seconds is interrupted, L seconds after the audio-video clip commences, for presenting a random challenge. The steps of rendering the viewer selected multimedia content, interrupting the multimedia clip for presenting a random challenge, invoking a response, and generating a response report may be repeated for other multimedia content in the list depending on the selection of the viewer. In an embodiment, the interrupted multimedia content is not resumed until a correct response is submitted for the random challenge by the viewer.

The interrupt time period is generated using a random generator 502g. A timer 501f is provided to begin counting the interrupt time period at the start of the play of the multimedia content. When the timer 501f reaches the interrupt time period, the play of the multimedia content is interrupted at a random time to present the random challenge to the viewer on the client device 501.

Figure 3:
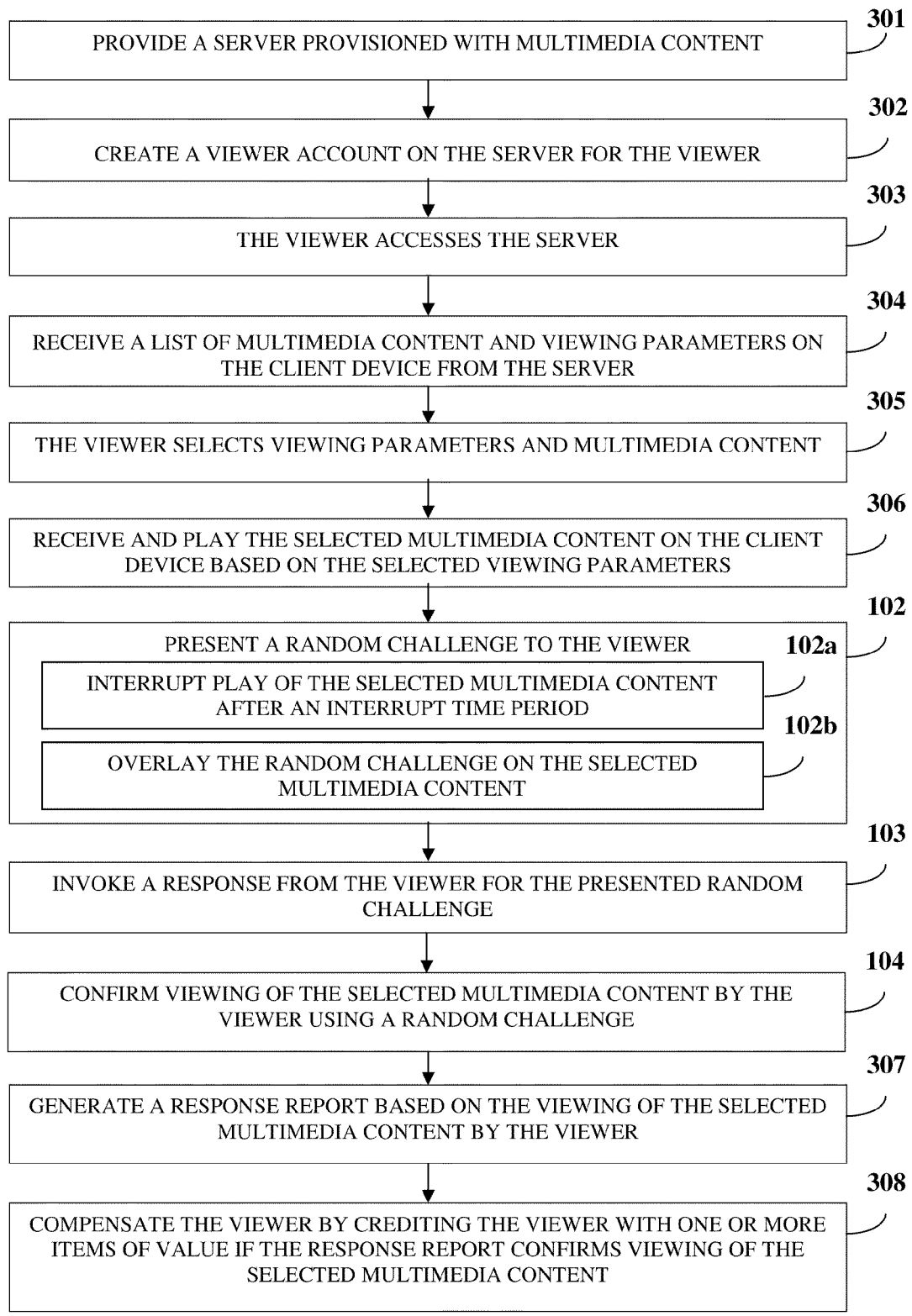
FIG. 3 illustrates a third embodiment of the computer implemented method for confirming that a viewer viewed multimedia content on a client device.

FIG. 3 illustrates a third embodiment of the computer implemented method for confirming that a viewer viewed multimedia content on a client device 501. A server 502 provisioned with multimedia content is provided 301. One or more multimedia content owners provision the server 502 with multimedia content by uploading the multimedia content on the server 502 or by providing a reference to the multimedia content uploaded on, for example a third party content server, a network of servers, servers that belong to the multimedia content owners, etc. The server 502 provides the viewer with controlled access to the server 502. The viewer creates 302 a viewer account on the server 502 for generating viewer credentials, for example, a user name, a password, etc. The server 502 acquires information, for example, personal information, marketing information, credit worthiness of the viewer, etc. to create the viewer account for the viewer. The marketing information comprises, for example, demographic data, psychographic data, behavioral data, etc. The psychographic data comprises, for example, attributes relating to personality, values, attitudes, interests, preferences, characteristics, or lifestyles of the viewer. The psychographic data is, for example, interests, activities, and opinions (IAO) variables. The behavioral data is based on observed user actions, for example, clicking on coupons, specific offers, purchasing, browsing patterns, web activities, etc. The demographic data is, for example, race, age, income, disabilities, mobility in terms of travel time to work or number of vehicles available, educational attainment, home ownership, employment status, geographical location, etc.

The viewer accesses 303 the server 502 by supplying the viewer credentials. The viewer logs in to the viewer account to use the services and resources on the server 502 by providing, for example, the username, the password, and other viewer credentials. During a login session, the viewer receives 304 a list of multimedia content and viewing parameters on the client device 501 from the server 502 for selection. The viewing parameters comprise, for example, a schedule, an order of playing the selected multimedia content, etc.

The viewer selects 305 one or more of the multimedia content from the list of multimedia content for on-demand streaming, storing the multimedia content for later viewing, etc. In an embodiment, the viewer may preselect the multimedia content and allow playing of the preselected multimedia content on the client device 501. The viewer also selects 305 one or more viewing parameters, for example, a schedule and an order of playing the selected multimedia content. In an embodiment, the viewer receives a list of predetermined multimedia content from the server 502 based on preselected preferences of the viewer.

The client device 501 receives 306 the selected multimedia content, for example, an advertisement, a commercial message, an educational clip, an entertainment clip, etc. from a media service provider via the server 502 and plays 306 the selected multimedia content based on the selected viewing parameters, for example, at a selected schedule and in a selected order of playing. In an embodiment, the server 502 may prompt the viewer to view the multimedia content.

The viewer is presented 102 with a random challenge for confirming viewing of the selected multimedia content by the viewer. In an embodiment, a random challenge is overlaid 102b on the selected multimedia content. In another embodiment, the server 502 interrupts 102a the play of the selected multimedia content after an interrupt time period for presenting the random challenge. The interrupt time period is less than duration of the selected multimedia content. The challenge content is generated and displayed at random on the multimedia content. A response is invoked 103 from the viewer for the presented random challenge. The response determines whether the viewer has viewed the multimedia content. Viewing of the selected multimedia content is confirmed 104 using the random challenge as disclosed in the detailed description of FIGS. 1-2.

A response report is generated 307 based on the viewing of the selected multimedia content by the viewer. The viewer is compensated 308 by crediting the viewer with one or more items of value if the response report confirms that the viewer has viewed the selected multimedia content. The items of value comprise, for example, one or more of points, points redeemable for cash, points redeemable for additional items of value, scores, scores redeemable for cash, scores redeemable for additional items of value, cash, viewing of premium multimedia content, units of virtual currency, and any combination thereof.

The multimedia content is streamed to the client device 501 using a network protocol that supports streaming media. For example, the network protocol comprises a user datagram protocol, a real time streaming protocol, a real time transport protocol, and a real time transport control protocol. These network protocols are used for controlling streaming media sessions between the server 502 and the client device 501. Furthermore, the delivery of the streaming multimedia content is via different modes of transmission, for example, unicast, multicast, or peer to peer transmissions. In an embodiment, the client device 501 receives the multimedia content from the server 502 as a progressive download. The multimedia content may be cached in segments on an intermediate system, for example, a "store and forward" system. For example, the server 502 transmits the multimedia content to the "store and forward" system that stores the multimedia content and then transmits the stored multimedia content to the client device 501 at predetermined intervals of time. The "store and forward" system may also send the multimedia content to one or more "store and forward" systems prior to sending the multimedia content to the client device 501.

The streams comprising the random challenge and the multimedia content are either integrated at the server 502 or combined at a web browser on the client device 501 of a viewer. The random challenge and the multimedia content may arrive at the client device 501 of the viewer as a single integrated stream or as two independent streams that are combined in real time at the client device 501. The random challenge and the multimedia content may also be stored in the client device 501 for simultaneous viewing at a time selected by the viewer. In an embodiment, the random challenges are stored in a database 502d. The server 502 retrieves the stored random challenges and presents the retrieved random challenges with the multimedia content to the viewer. In another embodiment, a single random challenge may be used with more than one multimedia content.

In an embodiment, the client device 501 presents the random challenge to the viewer for confirming the viewing of the selected multimedia content by the viewer. In this embodiment, the client device 501 generates the response report based on the viewing of the selected multimedia content by the viewer and stores the generated response report on the client device 501. The client device 501 transmits the response report to the server 502 for compensating the viewer with the items of value if the response report confirms the viewing of the selected multimedia content by the viewer. In another embodiment, the server 502 generates the response report.

In an embodiment, the viewer receives the list of multimedia content from the server 502 based on the marketing information acquired from the viewer during the creation of the viewer account. Consider an example where the viewer accesses the server 502 by providing an internet protocol (IP) address, for example, "76.166.144.13". The server 502 resolves location of the viewer to Los Angeles, Calif. The server 502 transmits advertisements of clothing stores, automobiles, etc. in the California region to the viewer. Consider another example where a viewer accesses the server 502 via the internet. The viewer provides marketing information, for example, location "New York", age "35", and favorite food "pizza", during creation of the viewer account. The server 502 transmits a list of advertisements of pizza places, for example, Pizza Hut, Domino's Pizza, etc. located in New York to the viewer's client device 501. The viewer selects advertisements of Domino's Pizza and selects a schedule and order for playing the advertisements. During playing of the received video advertisement, a random challenge, for example, a mathematical equation based challenge, comprising a random equation (3+4=?) or random numbers such as "6" and "2" is presented to the viewer. When the video advertisement ends, the viewer is presented with an opportunity to submit a solution to the mathematical equation, for example, "What is the sum of the numbers shown during the video?". If the viewer answers the question accurately, the server 502 confirms viewing of the video advertisement. The server 502 compensates the viewer with an item of value, for example, a coupon on confirming viewing of the multimedia content.

In another embodiment, the multimedia content provisioned to the server 502 by, for example, multimedia content owners, is assigned a particular category, for example, education, medicine, sports, etc., by, for example, multimedia content owners during the provisioning process, the server 502, etc. The viewer logging in to the server 502 using the viewer credentials is presented with an option of searching through the available multimedia content through the client device 501 based on the categories of the multimedia content. The server 502 enables the viewer to select the multimedia content based on the categories. In this embodiment, the categories are further classified into subcategories to provide the viewer with a fine tuned search of the available multimedia content.

The computer implemented method and system 500 disclosed herein is used for promoting the viewing of multimedia content, for example, an advertisement clip of a product, by generating interest in such viewing. The server 502 also enables promoting viewing of multimedia content by, for example, displaying advertisements alongside of the multimedia content being viewed by the viewer on the client device 501. In another embodiment, the server 502 enables promoting viewing by raising compensation from multiple viewers in a network.

In another embodiment, the server 502 provides the viewer with an electronic wallet (e-wallet) 502i associated with the viewer account for accruing the items of value over a period of time. In an embodiment, the multimedia content owner provides the items of value for confirming that the viewer has viewed the multimedia content. The multimedia content owner is debited a pre-agreed upon fee for each confirmation. In another embodiment, the media service provider administering the server 502 provides the items of value for confirming that the viewer has viewed the multimedia content. The media service provider may allow the viewer to view premium grade multimedia content as compensation. The server 502 deposits the items of value into the viewer's e-wallet 502i and debits a fee from the multimedia content owner, if the response report confirms the viewing of the selected multimedia content by the viewer. The server 502 enables the viewer to purchase products and services on an electronic commerce (e-commerce) platform using the items of value accrued in the e-wallet 502i. In another embodiment, the server 502 provides the viewer with an option of triggering playback of premium multimedia content in exchange for one or more items of value accrued in the e-wallet 502i and allows the premium multimedia content to play.

Figure 15A:
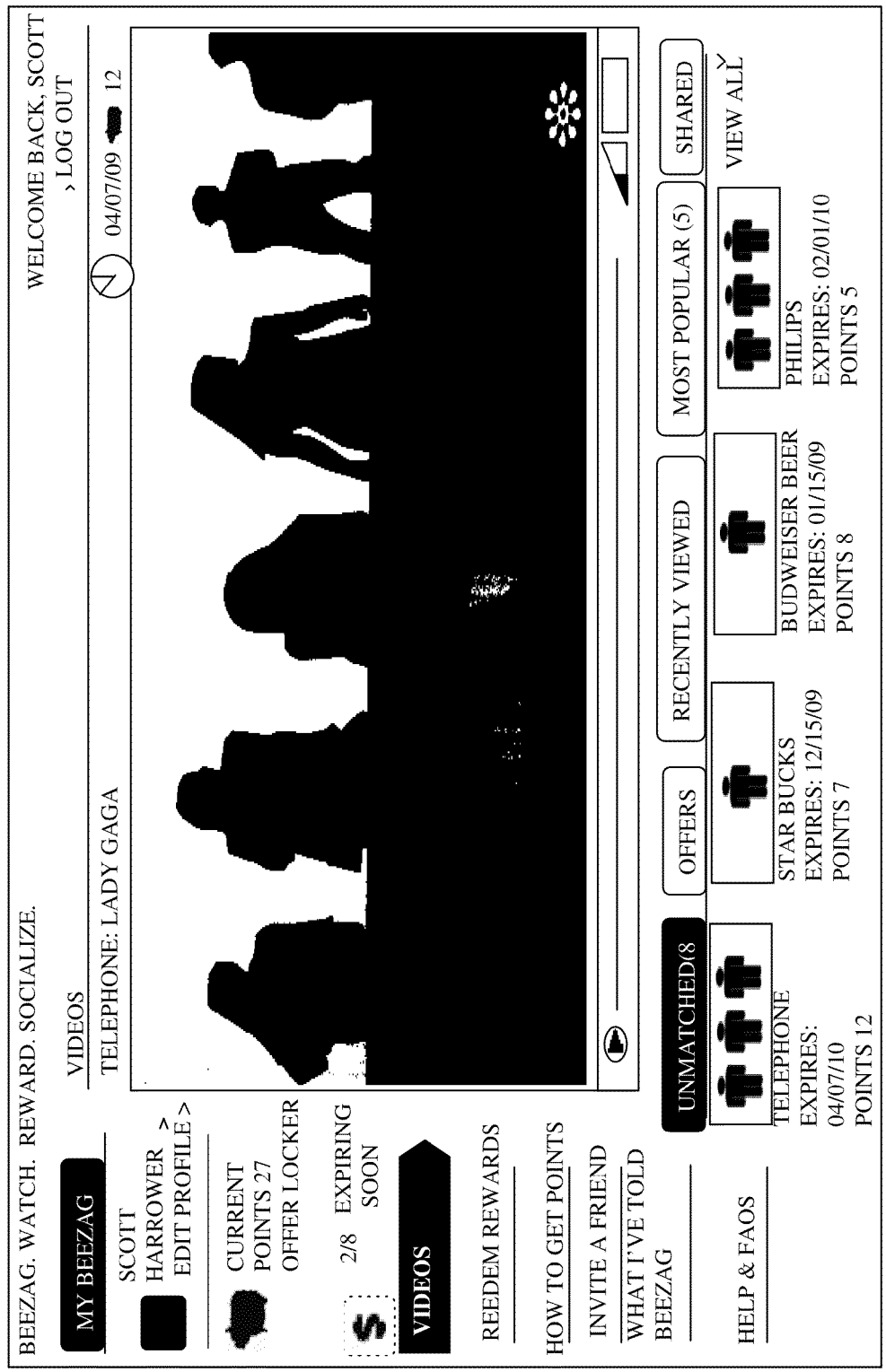

In an embodiment, the multimedia content is an advertisement clip that is streamed to the client device 501 on demand. The server 502 inserts an interactive promotional segment, for example, a clickable coupon, within the selected multimedia content as exemplarily illustrated in FIG. 15C. The interactive promotional segment directs the viewer to the e-commerce platform for enabling the viewer to purchase products, for example, digital versatile discs (DVDs) and services associated with the selected multimedia content on the e-commerce platform. In an embodiment, the interactive promotional segment directs the viewer to any e-commerce platform for enabling the viewer to purchase other products and services. The viewer may purchase products and services by redeeming the accrued items of value in the e-wallet 502i. The e-wallet 502i associated with the viewer account determines the value of the accrued items. In an embodiment, the clickable coupon used to direct the viewer to the e-commerce platform is redeemed for special discounts on the purchased products and services, or may allow viewing of premium grade multimedia content.

In another embodiment, the server 502 enables storage of information on a particular product or service to be purchased by the viewer if the compensation reflected in the e-wallet 502i is insufficient for purchase of the particular product or service by the viewer. In this embodiment, the server 502 enables the viewer to accrue sufficient compensation for the purchase of the stored product or service by providing a list of multimedia content to be viewed by the viewer, that provides compensation on confirming viewing of the multimedia content related to that particular product or service. The server 502 enables the viewer to accrue compensation over a period of time by confirming viewing of the multimedia content.

Figure 4:
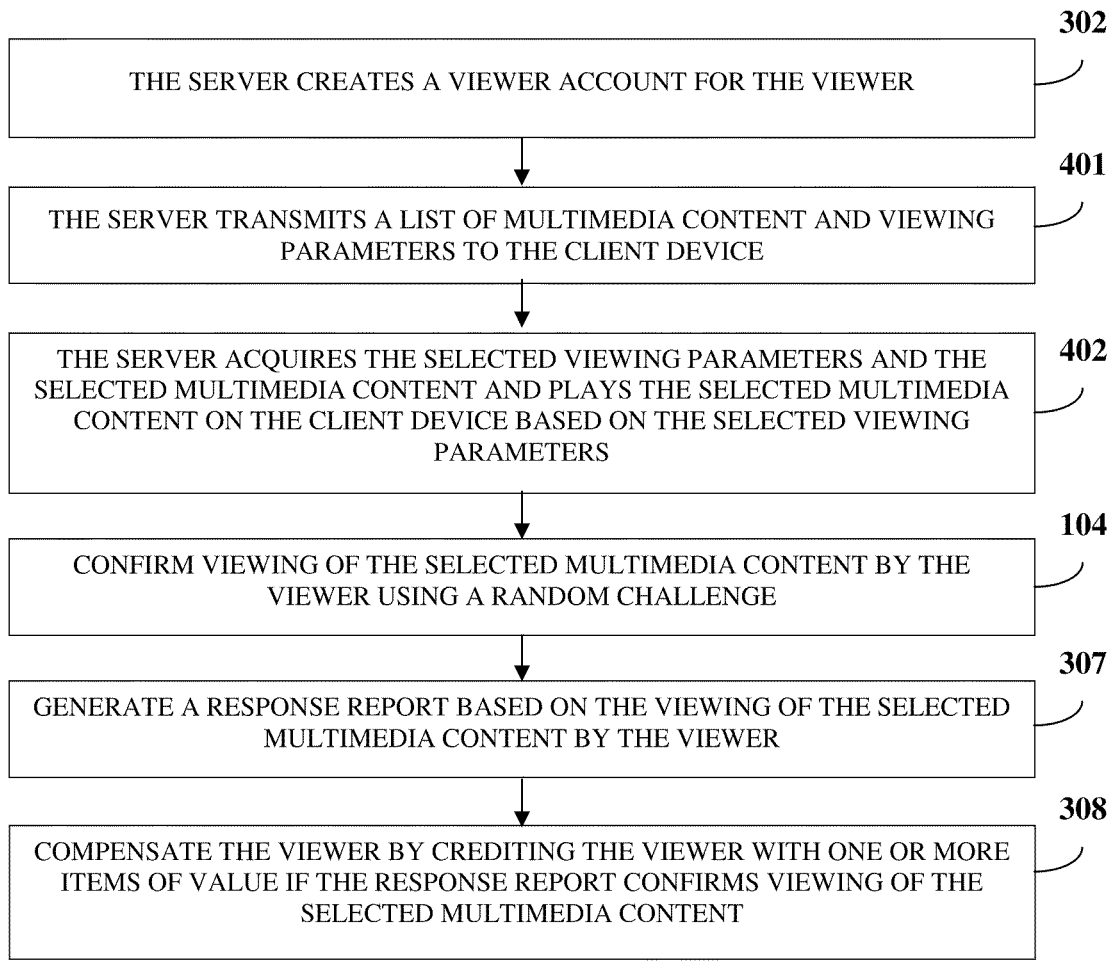
FIG. 4 illustrates the steps performed by a server for confirming that a viewer viewed multimedia content on a client device.

FIG. 4 illustrates the steps performed by a server 502 for confirming that a viewer viewed multimedia content on a client device 501. The server 502 creates 302 a viewer account for the viewer for generating viewer credentials. The server 502 provides the viewer with controlled access to the server 502 when the viewer supplies the generated viewer credentials. The server 502 transmits 401a list of multimedia content and viewing parameters to the client device 501 for selection by the viewer. The server 502 may transmit a list of multimedia content preselected by the viewer or based on the preferences of the viewer. The server 502 acquires 402 one or more of the viewing parameters and one or more of the multimedia content from the list of multimedia content selected by the viewer. The server 502 transmits the selected multimedia content to the client device 501 from the database 502d of the server 502 or from a location referenced by a multimedia content owner. The server 502 plays 402 the selected multimedia content on the client device 501 based on the selected viewing parameters. The server 502 may play the selected multimedia content on the client device 501 in, for example, real time or at a time selected by the viewer. The server 502 then confirms 104 viewing of the selected multimedia content using a random challenge and generates 307 a response report based on the viewing of the selected multimedia content by the viewer. The server 502 compensates 308 the viewer by crediting the viewer with one or more items of value if the response report confirms the viewing of the selected multimedia content by the viewer. In an embodiment, the server 502 compensates the viewer by allowing the viewer to view premium multimedia content in exchange for one or more items of value.

FIG. 5 illustrates a computer implemented system 500 for confirming that a viewer viewed multimedia content on a client device 501. The client device 501 of the viewer is, for example, a desktop computer, a notebook computer, a tablet computer such as an iPhone® or an iPad® of Apple Inc., a mobile phone device, a personal digital assistant, etc. The computer implemented system 500 comprises a server 502 and a client device 501 connected via a network 503. In an embodiment, the server 502 is, for example, a single server, a hierarchy of servers, a network of servers, etc. The client device 501 comprises a display screen 501a, an input means (not shown), a transceiver 505, a timer 501f, and a storage module 501g.

The server 502 comprises an account creation module 502h, an upload module 502f, a content management module 502k, a network interface 502m, a report receiving module 502a, an aggregator 502c, a search module 502l, a promotional segment creation module 502j, a random generator 502g, a database 502d, and a payment module 502b. The account creation module 502h creates a viewer account for the viewer on the server 502 for generating the viewer credentials. The upload module 502f enables one or more multimedia content owners to upload the multimedia content on the server 502. The content management module 502k transmits a list of multimedia content and viewing parameters to the client device 501 of the viewer for selection by the viewer. The computer implemented system 500 disclosed herein further comprises an interactive interface 502e for enabling the viewer to select the viewing parameters and one or more of the multimedia content from the list of multimedia content. The server 502 hosts the interactive interface 502e and provides the interactive interface 502e to the viewer on the display screen 501a of the client device 501 via the network 503. The viewer enters the selections on the interactive interface 502e using the input means on the client device 501. The content management module 502k acquires one or more of the viewing parameters and one or more of the multimedia content from the list of multimedia content selected by the viewer. The content management module 502k transmits the selected multimedia content to the viewer based on the selected viewing parameters.

The client device 501 connects to the server 502 via the network 503 for receiving the multimedia content from the server 502. The storage module 501g of the client device 501 stores the selected multimedia content for later viewing or for viewing at a time selected by the viewer. The multimedia content is played on the display screen 501a of the client device 501. The computer implemented system 500 disclosed herein further comprises a view confirmation module 501b provided on the client device 501 and/or the server 502. The view confirmation module 501b on the server 502 and/or the client device 501 confirms that the viewer has viewed the multimedia content on the client device 501 using a random challenge. The view confirmation module 501b comprises a challenge generator 501c, a challenge-response module 501d, and a report generation module 501e. The challenge generator 501c generates a random challenge that is one or more of random in content, presented at random times during and/or after the play of the multimedia content, and presented at random physical locations on the multimedia content. The challenge generator 501c may also generate a pseudorandom challenge as disclosed in the detailed description of FIG. 1. In an embodiment, the challenge-response module 501d presents the generated random challenge to the viewer on the display screen 501a of the client device 501 by overlaying the generated random challenge on the multimedia content. In another embodiment, the challenge-response module 501d presents the generated random challenge to the viewer on the display screen 501a of the client device 501 by interrupting the play of the selected multimedia content and inserting the generated random challenge in and/or around the selected multimedia content. The challenge-response module 501d presents one or more random challenges at one or more times during and/or after the multimedia content are played. The timer 501f counts an interrupt time period for interrupting the playing of the multimedia content and presenting the random challenge, wherein the interrupt time period is less than duration of the multimedia content. The random generator 502g generates the interrupt time period for interrupting the playing of the selected multimedia content and presenting the random challenge.

The challenge-response module 501d invokes a response from the viewer for the presented random challenge. The viewer enters the response to the presented random challenge using the input means on the client device 501. The timer 501f ensures that the viewer provides the response to the random challenge within the predetermined period of time, after the random challenge is presented. The challenge-response module 501d determines whether the viewer entered a response for the presented random challenge. The response confirms that the multimedia content has been viewed by the viewer. The challenge-response module 501d also determines whether the response from the viewer to the presented random challenge is correct. A correct response confirms that the multimedia content has been viewed by the viewer. The report generation module 501e generates a response report based on the response from the viewer and transmits the response report to the server 502. The response report may also be generated by the view confirmation module 501b on the server 502 in the online mode.

The payment module 502b compensates the viewer with one or more items of value based on viewing of the selected multimedia content by the viewer. The payment module 502b credits the viewer with an item of value and debits a fee from the multimedia content owner, if the response report confirms that the multimedia content was viewed by the viewer. In an embodiment, the payment module 502b compensates the user by allowing premium multimedia content to play, if the response report confirms that the multimedia content was viewed by the viewer. In another embodiment, the payment module 502b credits the viewer with an item of value and debits a fee from the multimedia content owner for each correct response that the viewer provides to one or more of the presented random challenges. In another embodiment, the payment module 502b distributes revenues generated from fees obtained from the multimedia content owners, registration fees, etc. to the viewer as items of value.

In an embodiment, the account creation module 502h also creates an e-wallet 502i associated with the viewer account for accruing the items of value over a period of time. The payment module 502b deposits the item of values into the e-wallet 502i and debits a fee from a multimedia content owner, if the response report confirms the selected multimedia content was viewed by the viewer.

The promotional segment creation module 502j creates and inserts an interactive promotional segment within the selected multimedia content. The interactive promotional segment directs the viewer to an e-commerce platform where the viewer can purchase products and services associated with or not related to the selected multimedia content.

The server 502 transmits multimedia content to the viewer either on request or automatically. The database 502d stores several multimedia content files in different formats, and is updated after every cycle of production of the multimedia content. The multimedia content stored in the database 502d comprises audio, video, internet web pages, interactive games and applications, and other playable formats. The aggregator 502c queries the database 502d and prepares a list of multimedia content available for distribution over the network 503. The network interface 502m connects the server 502 to the network 503, such as the internet, a wireless network, or a wired network. The server 502 also comprises media encoders for encoding the multimedia content for storing and on-demand streaming. The database 502d also stores information of the viewer, the viewer credentials, preferences of the viewer, the multimedia content, locations of the multimedia content, the viewing parameters, etc.

The client device 501 may also download a client software module, for example, a view confirmation module 501b over the network 503 for making service requests to the server 502, while the server 502 addresses the service requests. The network 503 is, for example, a cellular network, the internet, a local area network, or any other network established using available networking protocols.

The transceiver 505 of the client device 501 connects the client device 501 to the server 502 via the network 503. In the case of a cellular client device, the transceiver 505 communicates with the server 502 via a cellular telephone network 504. The input means accepts a selection of the multimedia content and the viewing parameters from the viewer. The client device 501 is capable of downloading, storing, and rendering multimedia content of one or more formats obtained from the server 502. The multimedia content, incorporating the challenge-response mechanism, may also be transmitted through the network 503 and rendered on a web browser in an internet enabled client device or mobile phone as streaming multimedia content. The multimedia content may also be distributed to televisions via integrated receivers/decoders or set top boxes and viewed through interactive television. In an example, the multimedia content is made available in an interactive group setting or multi-viewer environment, such as a focus group, for viewing the multimedia content, discussing, testing, or any other purposes.

The challenge-response module 501d in the view confirmation module 501b presents a random challenge by briefly overlaying the random challenge on the multimedia content being played. The challenge-response module 501d invokes a response from the viewer for the random challenge. In an embodiment, the server 502 comprises the view confirmation module 501b either in addition to or as a substitute for the challenge-response module 501d on the client device 501. The report receiving module 502a receives the response report transmitted by the client device 501. The payment module 502b in communication with the report receiving module 502a generates and maintains a monetary credit for the viewer based on the response report.

The search module 502l on the server 502 enables the viewer to search for the multimedia content on the server 502. In an embodiment, the client device 501 downloads the multimedia content when the client device 501 is connected to the server 502. If eventually the viewer launches the view confirmation module 501b when the connection to the server 502 is inactive, the client device 501 renders the downloaded multimedia content in an off-line mode, performs a challenge-response interaction with the viewer, and generates and stores the response report. The offline mode is triggered when the connection to the server 502 is inactive. When a connection to the server 502 is established via, for example, satellite, a mobile wireless connection, the network 503, etc., the response report is transmitted to the server 502 over the connection. In another embodiment, the client device 501 renders the multimedia content transmitted by the server 502 as streaming multimedia content. If the viewer launches the view confirmation module 501b when the connection to the server 502 is active, the client device 501 renders the multimedia content in an online mode. In an embodiment, the view confirmation module 501b on the server 502 performs the challenge-response interaction with the viewer. The response report generated after completing the challenge-response interaction is transmitted to the server 502 over the active connection. The view confirmation module 501b on the server 502 also generates the response report in the online mode.

In another embodiment, the server 502 stores information regarding viewing behavior of the viewer in the database 502d. The server 502 extracts data regarding the viewing behavior of the viewer from the stored information and determines the list of multimedia content that the viewer is likely to view. The server 502 then transmits the determined list of multimedia content to the viewer and one or more viewing parameters for selection.

In an embodiment, the server 502 may periodically notify the viewer of the available multimedia content, such as advertisements, including the amount payable to the viewer for viewing each advertisement. The server 502 also notifies the viewer of the available advertisements upon request of the viewer. For example, the server 502 periodically transmits short message service (SMS) messages to the client device 501, for example, a cellular phone of the viewer. In another example, the server 502 may notify the viewer by broadcasting unstructured supplementary service data (USSD) messages. Upon the request of the viewer, the server 502 may transmit an updated list of multimedia content to the client device 501 for selection and viewing by the viewer.

In an embodiment, the server 502 further comprises a registration facility whereby a potential viewer registers the client device 501 for the media service. During the registration process, the viewer is requested to submit the unique identifier of the client device 501, an identity of the viewer, and optionally a password or a personal identification number (PIN) for authentication, and a credit account number. After completing the registration process, a user identifier (ID) and suitable software module, for example, the view confirmation module 501b is supplied to the client device 501 of the viewer. The view confirmation module 501b is executed for programming the client device 501 of the viewer, whereby the client device 501 is rendered capable of establishing a client-server relationship with the server 502.

In an example, the viewer requests the server 502 to access a service through the client device 501. The server 502 verifies whether the viewer is authenticated to access the service by requesting the user identifier supplied during registration, and transmits multimedia content to the client device 501 for selection. If the server 502 fails to authenticate the viewer, the server 502 prompts the viewer to undergo the registration process. The viewer may choose to continue with the registration process or terminate the connection to the server 502. After the viewer is authenticated, the client device 501 receives the multimedia content. The client device 501 launches the view confirmation module 501b and the display screen 501a presents a menu with options for displaying the list of multimedia content including the monetary amount payable to the viewer for viewing each multimedia content item in the list. The viewer selects a desired multimedia content item using the menu, and the selected multimedia content item is played to the viewer. The challenge-response module 501d presents the random challenge and invokes a response during or after the multimedia content is played.

The report generation module 501e generates a response report with report details based on the response received from the viewer. The client device 501 verifies whether the connection to the server 502 is active, and transmits the response report to the server 502. The report receiving module 502a receives the response report and instructs the payment module 502b to credit the viewer's e-wallet 502i associated with the viewer account with a designated amount of money, points or other items of value. If the connection to the server 502 is temporarily unavailable, the response report is temporarily stored in the storage module 501g of the client device 501, and transmitted when the connection is available again. The recently viewed multimedia content is deleted from the list, and the list of available multimedia content is updated and displayed again on the client device 501 for repeating the steps described above. Alternatively, the viewer may choose to terminate the view confirmation module 501b at this point by selecting an exit option from the menu.

Figure 6:
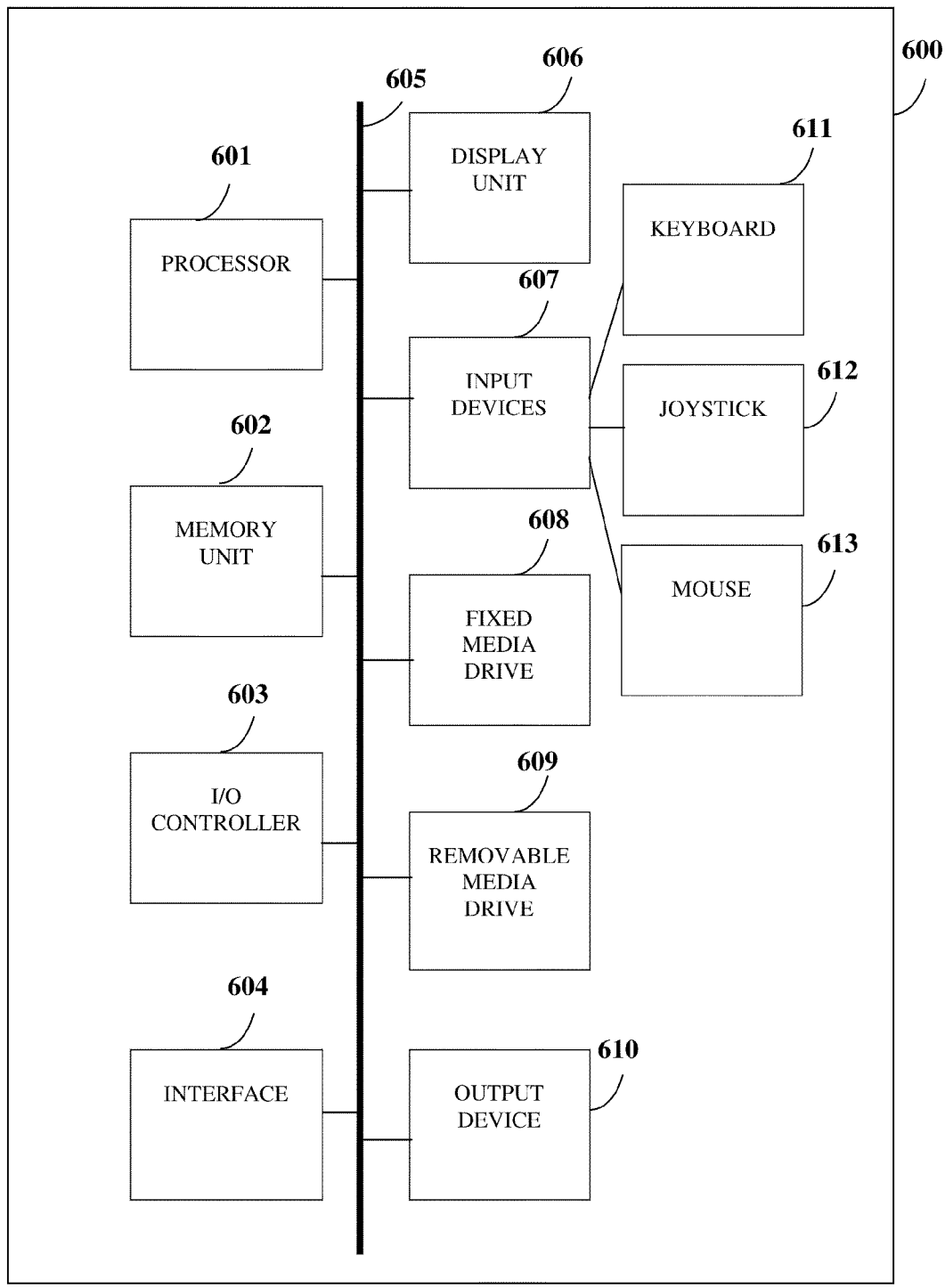
FIG. 6 exemplarily illustrates the architecture of a computer system employed on the client device and the server.
Figure 7A:
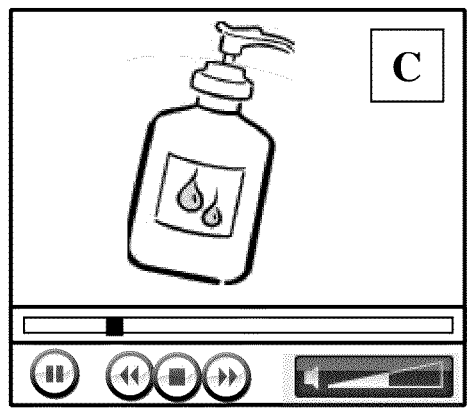
FIGS. 7A-7D exemplarily illustrate screenshots for a video advertisement campaign.
Figure 7B:
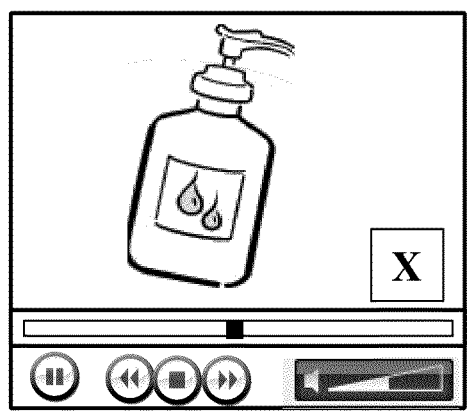
Figure 7C:
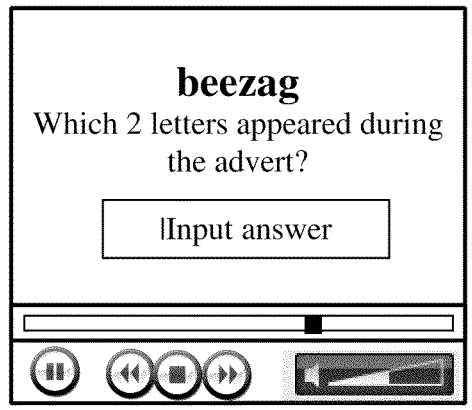
Figure 7D:
Figure 8A:
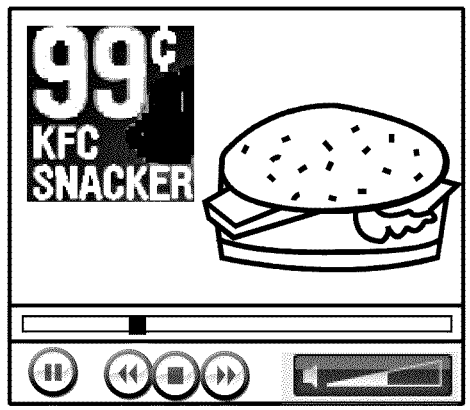
FIGS. 8A-8D exemplarily illustrate screenshots for a video advertisement campaign.
Figure 8B:
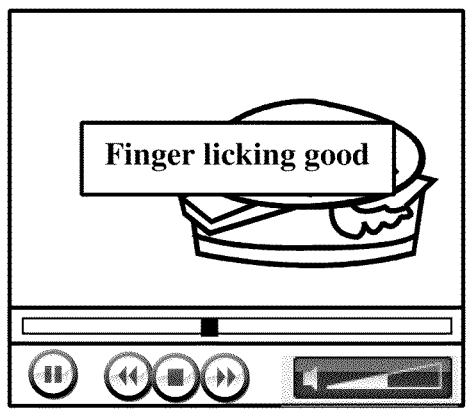
Figure 8C:
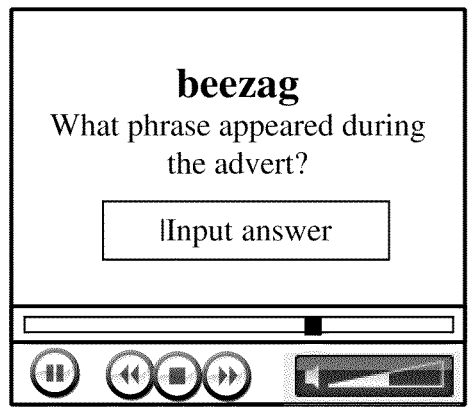
Figure 8D:
Figure 9A:
FIGS. 9A-9D exemplarily illustrate screenshots of a training video for managers.
Figure 9B:
Figure 9C:
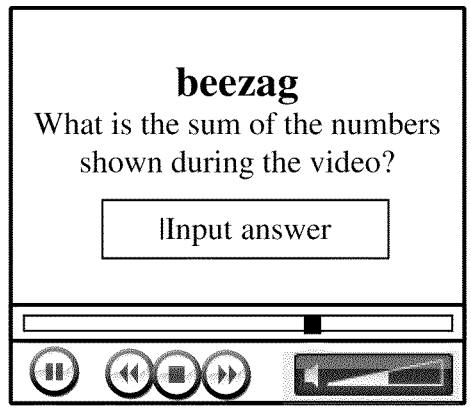
Figure 9D:
Figure 10A:
FIGS. 10A-10D exemplarily illustrate screenshots for an iPhone application and a coupon offer.
Figure 10B:
Figure 10C:
Figure 10D:
Figure 11A:
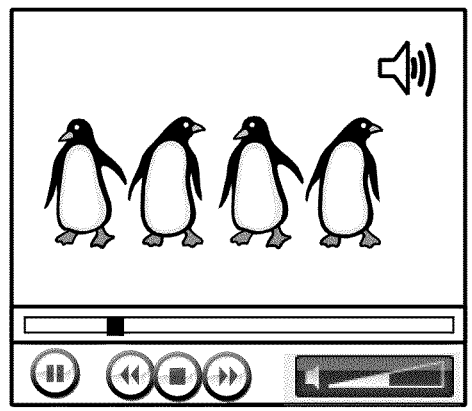
FIGS. 11A-11D exemplarily illustrate screenshots for a video advertisement campaign.
Figure 11B:
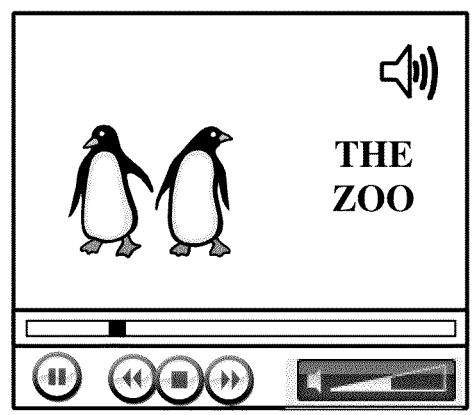
Figure 11C:
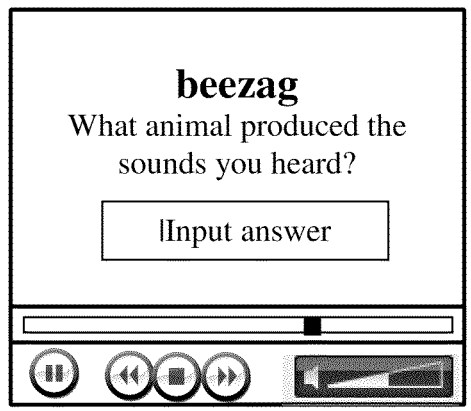
Figure 11D:

FIG. 6 exemplarily illustrates the architecture of a computer system 600 employed on the client device 501 and the server 502. The computer system 600 executes the view confirmation module 501b. The computer system 600 comprises a processor 601, a memory unit 602 for storing programs and data, an input/output (I/O) controller 603, an interface 604, and a display unit 606 communicating via a data bus 605.

The memory unit 602 comprises a random access memory (RAM) and a read only memory (ROM). The computer system 600 further comprises one or more input devices 607, for example, a keyboard 611 such as an alphanumeric keyboard, a mouse 613, a joystick 612, a touch-sensitive screen, a voice recognition system, etc. The input devices 607 are used for inputting data into the computer system 600. The computer system 600 communicates with other computer systems through the interface 604, for example, a Bluetooth® interface, an infrared (IR) interface, a WiFi interface, a universal serial bus interface (USB), a local area network or wide area network (LAN or WAN) interface, etc.

The computer system 600 further comprises a fixed media drive 608 and a removable media drive 609 for receiving removable media. The computer system 600 further comprises output devices 610, for example, a printer for receiving and reading digital data on a compact disk, a digital video disk or other medium. Computer applications or programs are used for operating the computer system 600. The programs are loaded onto the fixed media drive 608 and into the memory unit 602 of the computer system 600 via the removable media drive 609. In an embodiment, the computer applications and programs may be loaded directly through the network 503. Applications are executed by double clicking a related icon or menu displayed on the display unit 606 using the mouse 613 or through other input devices 607.

The computer system 600 of the client device 501 and the server 502 employ an operating system for performing multiple tasks. The operating system is responsible for the management and coordination of activities and the sharing of the resources of the computer system 600. The operating system further manages security of the computer system 600, peripheral devices connected to the computer system 600, and network connections. The operating system recognizes keyboard inputs and pointing device inputs of a viewer, output display, files and directories stored locally on the fixed media drive 608. Different programs, for example, a web browser, an electronic mail (email) application, etc. initiated by the viewer are executed by the operating system with the help of the processor 601, for example, a central processing unit (CPU). The operating system monitors the use of the processor 601. The operating system on the computer system 600 executes different modules initiated by the client device 501 and the server 502 using the processor 601. The location of the instructions in the program memory is determined by a program counter (PC).

The instructions fetched by the processor 601 from the program memory after being processed are decoded. After processing and decoding, the processor 601 executes the instructions. For example, the account creation module 502h defines instructions for creating the viewer account for generating viewer credentials. The account creation module 502h further defines instructions for creating the e-wallet 502i associated with the viewer account, that accrues one or more items of value over a period of time. The upload module 502f defines instructions for uploading the multimedia content on the server 502. The aggregator 502c defines instructions for querying the database 502d and preparing a list of multimedia content available for distribution over the network 503. The content management module 502k defines instructions for transmitting a list of multimedia content and viewing parameters to the client device 501 of the viewer for selection by the viewer. The content management module 502k defines instructions for acquiring one or more of the viewing parameters and one or more of the multimedia content from the list of multimedia content selected by the viewer. The search module 502l defines instructions for searching for the multimedia content on the server 502. The content management module 502k defines instructions for streaming or transmitting the selected multimedia content to the client device 501 based on the selected viewing parameters. The storage module 501g on the client device 501 defines instructions for storing the selected multimedia content for later viewing. The promotional segment creation module 502j defines instructions for creating and inserting an interactive promotional segment within the multimedia content.

The view confirmation module 501b defines instructions for the challenge generator 501c, the challenge-response module 501d, and the report generation module 501e. The challenge generator 501c defines instructions for generating a random challenge that is one or more of random in content, presented at random times during and/or after the play of the selected multimedia content, and presented at random physical locations on the selected multimedia content. The random generator 502g defines instructions for generating the interrupt time period for interrupting the playing of the selected multimedia content and presenting the random challenge. The challenge-response module 501d defines instructions for presenting the generated random challenge to the viewer on the display screen 501a of the client device 501 by overlaying the generated random challenge on the multimedia content or inserting the generated random challenge on interruption of the play of the selected multimedia content. The challenge-response module 501d defines instructions for presenting one or more random challenges at one or more times during and/or after the playing of multimedia content and for invoking a response from the viewer for the presented random challenge. The challenge-response module 501d further defines instructions for determining whether the viewer entered a response for the presented random challenge to confirm the viewer has viewed the selected multimedia content.

The report generation module 501e defines instructions for generating a response report based on the response from the viewer and transmitting the response report to the server 502. The report receiving module 502a defines instructions for receiving the response report transmitted by the client device 501. The random generator 502g defines instructions for generating an interrupt time period. The payment module 502b in communication with the report receiving module 502a defines instructions for compensating the viewer by crediting the viewer with one or more items of value, if the response report confirms that the multimedia content was viewed by the viewer. The database 502d defines instructions for storing information of the viewer, the viewer credentials, preferences of the viewer, the multimedia content, locations of the multimedia content, and the viewing parameters. The defined instructions are stored in the program memory or received from a remote server.

The processor 601 of the server 502 retrieves instructions defined by the account creation module 502h, the upload module 502f, the aggregator 502c, the content management module 502k, the search module 502l, the random generator 502g, the modules 501c, 501d, and 501e of the view confirmation module 501b, the report receiving module 502a, the promotional segment creation module 502j, the payment module 502b, and the database 502d, and executes the instructions. The processor 601 of the client device 501 retrieves instructions defined by the storage module 501g and the modules 501c, 501d, and 501e of the view confirmation module 501b, and executes the instructions.

The instructions from the view confirmation module 501b are stored in the memory unit 602. The multimedia content is transferred from the database 502d to the view confirmation module 501b through the interface 604 and via the network 503. A viewer initiates the execution of the view confirmation module 501b by double clicking on the icon for the view confirmation module 501b on the display unit 606 or the execution of the view confirmation module 501b is automatically initiated on transmitting multimedia content to the view confirmation module 501b. The processor 601 retrieves instructions for executing the view confirmation module 501b from various modules, for example, the challenge generator 501c, the challenge-response module 501d, and the report generation module 501e in the view confirmation module 501b. The locations of the instructions in the modules 501c, 501d, and 501e are determined by a program counter (PC). The program counter stores a number that identifies the current position in the program of the view confirmation module 501b. The instructions fetched by the processor 601 from the program memory after being processed are decoded. The instructions are placed in an instruction register (IR) in the processor 601. After processing and decoding, the processor 601 executes the instructions. The instructions comprise, for example, rendering the multimedia content selected by the viewer, presenting a random challenge by overlaying the random challenge on the multimedia content, generating a response report for the viewer, etc. At the time of execution, the instructions stored in the instruction register are examined to determine the operations to be performed. The specified operations are then performed by the processor 601. The operations include arithmetic and logic operations.

The operating system performs multiple routines for performing a number of tasks required to assign the input devices 607, the output devices 610, and the memory unit 602 for execution of the view confirmation module 501b. The tasks performed by the operating system comprise assigning memory to the view confirmation module 501b and data, moving data between the memory unit 602 and disk units and handling input/output operations. The operating system performs the tasks on request by the operations and after performing the tasks, the operating system transfers the execution control back to the processor 601. The processor 601 continues the execution to obtain one or more outputs. The outputs of the execution of the view confirmation module 501b are displayed to the viewer on the display unit 606.

A server setup as exemplary illustrated in FIG. 5 comprises the database 502d for storing multimedia content of commercial, educational, and entertaining in nature. For example, multimedia content such as advertisement media clips are obtained in suitable formats from advertisement agencies or media representatives of product and service companies, and uploaded to the database 502d. In another example, the advertisement agencies or the media representatives undertaking extensive campaigning may add new advertisement media clips, and update or modify existing advertisement media clips by accessing the database 502d. The aggregator 502c recognizes changes made to the contents of the database 502d, including metadata changes, for example, changes in the duration of the advertisement media clips, the names of the advertisement media clips, etc., and prepares and updates the list of multimedia content.

The server 502 may allow controlled access to the server 502 and the resources therein, such as the database 502d, through a web front-end. An example of such a web front-end is a website, for example, http://www.beezag.com. The advertisement agencies or the media representatives are required to setup an account for themselves by registering as an approved advertiser through the web front-end before submitting their advertisement clips. The approval workflow for registering advertiser accounts and uploading advertisement clips may be assigned to process owners or administrators on a regional basis. Furthermore, the approval workflow may include different stages of approval such as account-level approval, financial approval, and publishing approval. After the advertiser registers an account, the advertiser may upload advertisement clips and other multimedia content into the database 502d for distribution to targeted viewers. The advertiser may be charged designated amounts for each confirmed view and non-confirmed view response report received by the server 502.

The advertisement multimedia clips comprise, for example, audio clips, video clips, animations, still images, text attachments, or suitable combinations of these. The advertisement clips also comprise promotional segments such as universal resource locators (URLs) directing viewers to the web front-end or other proprietary websites of the product and service companies. The promotional segments may also include digital coupons or vouchers redeemable for special discounts on advertised products and services, questionnaire for sharing additional information, etc. The coupons and vouchers may also be distributed to targeted viewers via short message service (SMS) messages.

In an embodiment, the viewer is prompted to share the viewed multimedia content, such as advertisement clips through the view confirmation module 501b on the client device 501 or the server 502. The viewers may share the advertisement clips by syndicating or micro-blogging the advertisement clips on social networking websites such as Twitter™, Facebook™, Myspace™, etc., or by forwarding the advertising clips through email services, instant messages, SMS, MMS, etc.

Enumerated herein are examples of the computer implemented method and system 500 disclosed herein, categorized by the challenge content and the invoked response. In an example, the challenge content and the invoked response comprise visual and mentally-solvable challenge-responses. Consider an example where the company Pfizer Inc. creates a video advertisement for Purell® hand sanitizer targeted for mothers of children between the ages of 5 to 21. A video advertisement campaign is created and uploaded into the database 502*d* using the upload module 502*f*, via the web front-end of the media service provider, for delivery to the target demographic membership selected in the web front-end. FIGS. 7A-7D exemplarily illustrate screenshots for a video advertisement campaign for the hand sanitizer. An alphanumeric-based challenge comprising random letters is presented to the viewer during the play of the video advertisement. A first letter "C" occurs at 10 seconds into the video advertisement and is placed in the top right corner of the display screen 501*a* as exemplarily illustrated in FIG. 7A. A second letter "X" occurs 5 seconds before the end of the video advertisement and is placed in the bottom right corner of the display screen 501*a* as exemplarily illustrated in FIG. 7B. When the video advertisement ends, the viewer is presented with a question, for example, "Which two letters appeared during the advert?" as exemplarily illustrated in FIG. 7C. If the viewer answers the question correctly, viewing of the video advertisement by the viewer is confirmed. The view confirmation module 501*b* sends a message, for example, "You have answered correctly!" as exemplarily illustrated in FIG. 7D and instructs the payment module 502*b* to credit an item of value, for example, $1, to the viewer account or the viewer's e-wallet 502*i*. The view confirmation module 501*b* enables control of random challenge variables, for example, the number of alphanumeric characters presented during the advertisement play, the timing of the appearance and disappearance of the alphanumeric characters, a threshold accuracy of the viewer's response to the challenge to register a positive response, the time-out period for the response, etc.

In another example, Kentucky Fried Chicken (KFC®) Corporation creates a video advertisement for their new chicken snacker targeted for men and women between the ages 18 to 55 in northeast United States. A video advertisement campaign is created and uploaded into the web front-end for delivery to the target demographics. FIGS. 8A-8D exemplarily illustrate screenshots for a video advertisement campaign for KFC's chicken snacker. A keywords and phrases based challenge comprising a random word or phrase is presented to the viewer during the play of the video advertisement. During the play of the video advertisement as exemplarily illustrated in FIG. 8A, the phrase "Finger Licking Good!" is presented in a child window as exemplarily illustrated in FIG. 8B. When the video advertisement ends, the viewer is presented with a question about the words or phrases presented during the video advertisement as exemplarily illustrated in FIG. 8C. If the viewer answers the question correctly, the viewer confirms viewing of the video advertisement as exemplarily illustrated in FIG. 8D. The view confirmation module 501*b* instructs the payment module 502*b* to credit an item of value, for example, $1, to the viewer account or the viewer's e-wallet 502*i* on confirming that the viewer viewed the video advertisement. Among the random challenge variables, a variable in this example is the description of the keywords and phrases in a predefined set for random selection. The phrases in the predefined set comprise, for example, "Think KFC", "Finger Licking Good", "We do chicken right", "There's Fast Food, Then There's KFC", etc.

In another example, a human resource consultancy creates a sexual harassment training video for managers of employees in the state of California. The video is delivered online in discreet video chapters. FIGS. 9A-9D exemplarily illustrate screenshots of a training video for managers. A mathematical equation based challenge is selected by the consultancy, comprising a random equation, for example, 3+4=?, or random numbers such as "6" and "2" as exemplarily illustrated in FIGS. 9A-9B. This mathematical equation based challenge is presented to the viewer during the video chapter. When the video chapter ends, the viewer is presented with an opportunity to submit a solution to the mathematical equation, such as, "What is the sum of the numbers shown during the video?" as exemplarily illustrated in FIG. 9C. If the viewer answers the question correctly, the viewer confirms viewing of the video chapter as exemplarily illustrated in FIG. 9D. The view confirmation module 501*b* instructs the payment module 502*b* to credit an item of value, for example, $1, to the viewer account or the viewer's e-wallet 502*i* on confirming that the viewer viewed the video advertisement. Among the random challenge variables, a variable in this example is the degree of difficulty of the random equations depending on the operators in the equation.

In another example category, the challenge content and the invoked response comprise visual and motor based challenge-responses. Johnson & Son, Inc. creates an iPhone° application and a coupon offer for Off!® Insect Repellants targeted for iPhone users herein referred to as "viewers". FIGS. 10A-10D exemplarily illustrate the screenshots for an iPhone application and a coupon offer. The iPhone application randomly overlays and removes images of mosquitoes and other bugs during the play of a video advertisement, as exemplarily illustrated in FIG. 10B-10C, and requests the viewer to, for example, "Squash all the insects while viewing the advertisement" as exemplarily illustrated in FIG. 10A. In responding to the challenge in real time, the viewer touches the iPhone screen for simulating squashing of the random bugs that appear during the video. When the video ends, the viewer is presented with a score reflecting the viewer's performance. If the score is sufficient, the viewer is presented with a digital coupon as exemplarily illustrated in FIG. 10D. If the score is insufficient, the viewer has the opportunity to replay. The random challenge variables, for example, the number of bug images presented during the video play, the timing of the appearance and disappearance of the bug images, a threshold score for earning a coupon, etc., is implemented in the iPhone application.

In another example, Johnson & Son, Inc. creates a web-based gaming application and a coupon offer for "Off! Insect Repellants" targeted for males and females of ages 18 to 55 and above in the southeast of the United States. The web-based gaming application randomly overlays and removes images of mosquitoes and other bugs during the play of a video. In responding to the challenge in real time, the viewer right-clicks over as many bug images as possible on a computer monitor screen, for simulating squashing of the random bugs, before the video ends. When the video ends, the viewer is presented with a score reflecting the viewer's performance. If the score is sufficient, the viewer is presented with a digital coupon to print or forward to a mobile client device. If the score is insufficient, the viewer has the opportunity to replay.

In another example, the challenge content and the invoked response comprise audio based challenge-responses. For example, the San Diego zoo creates a video advertisement for the summer season targeting mothers in southern California. A video advertisement campaign is created and uploaded into the web front-end for delivery to the target demographics. FIGS. 11A-11D exemplarily illustrate the screenshots for a video advertisement campaign. A hear and type challenge is presented to the viewer with a question about the audio elements randomly inserted and overlaid onto the audio content of the video advertisement as exemplarily illustrated in FIGS. 11A-11B. The random audio elements comprise, for example, animal sounds, bird sounds, etc. The question is, for example, "What animal produced the sounds you heard?" as exemplarily illustrated in FIG. 11C. If the viewer answers the question correctly, the viewer confirms viewing of the video advertisement as exemplarily illustrated in FIG. 11D and provides the viewer with a coupon. Among the random challenge variables, a variable in this example is the type of audio elements in the predefined set for random selection and overlaying.

In another example, the San Diego zoo creates a mobile phone based marketing campaign for the summer season targeted at mothers in southern California. The marketing campaign involves a chance to win a 10% discount on adult entry ticket prices. The mobile phone based marketing campaign is created for delivery to the target demographics, and a hear and speak challenge-response is selected by the advertiser. A mobile phone user is notified of the marketing campaign through print advertisements or USSD broadcast messages directing the mobile phone user to call a phone number, listen to the summer events at the zoo, and win a 10% discount on the entry ticket price. When the mobile phone user calls, the mobile phone user is greeted with a recorded voice that lists the upcoming zoo events and attractions. The recorded voice is randomly interrupted, for example, by the sounds of animals and birds, etc. At the end of the call, the recorded voice presents the mobile phone user with a question about the audio elements randomly inserted and overlaid onto the recorded voice. The mobile phone user is then prompted to answer with a voice prompt, for example, "Speak your answer at the tone". The speech recognition software in the mobile phone or the server 502 processes the speech utterance representing the answer from the mobile phone user. If the mobile phone user answers the question correctly, the mobile phone user confirms that the mobile phone user has listened to the voice recording, and obtains a coupon by, for example, SMS. Among the random challenge variables, a variable in this example is the accuracy in recognizing the speech utterance that qualifies the mobile phone user to type in the answer using a keypad for a positive response.

Consider an example where the viewer creates a viewer account on the server 502 and generates a username and a password for accessing the server 502. The viewer uses, for example, a Java™ enabled mobile device herein referred to as a "mobile device" to create the viewer account via a front-end of the server 502. Subsequently, the viewer logs in to the viewer account using the mobile device and starts using the services offered on the front-end. During the login session, the viewer's mobile device receives a list of advertisement clips available for viewing. The viewer selects one or more advertisement clips for on-demand streaming. The viewer also selects the schedule for the on-demand streaming and the order of playing of the selected multimedia content. For instance, the viewer selects to initiate the on-demand streaming during the present login session. The selected advertisement clips are streamed to the mobile device in the order selected by the viewer. For example, a first advertisement clip begins to play on the mobile device in real time. A challenge-response interaction takes place during and/or after the first multimedia content is played. A response report is generated when a response is entered by the viewer for the challenge presented during the challenge-response interaction. A second advertisement clip begins playing on the mobile device in real time, and the viewer undergoes another challenge-response interaction while viewing the second advertisement clip, and so on. The viewer accrues compensation in the form of items of value for confirming viewing of the selected advertisement clip based on the generated response reports. The accrued compensation, in aggregate, may equal the value of, for example, premium multimedia content, and when the premium multimedia content value is reached, the viewer is notified that the premium multimedia content can be played in its entirety. The accrued compensation is reflected by the e-wallet 502i associated with the viewer account.

In another example, the viewer uses a computer with a web browser to create the viewer account via a front-end of the server 502. Subsequently, the viewer logs in to the viewer account using an interactive television supported by a set top box connected to a viewer's television set. During the login session, a graphical user interface (GUI) element, such as a panel on the interactive television lists the multimedia content available for viewing. The viewer uses a remote control device to select one or more multimedia content for on-demand streaming via an interactive television network. The remote control device is, for example, a mobile phone, a network enabled personal digital assistant, etc. The viewer also selects the schedule for the on-demand streaming and the order of playing of the selected multimedia content. For instance, the viewer selects to begin the on-demand streaming at a selected schedule in future.

The viewer tunes in to the interactive television at the selected schedule and logs in to the viewer account, either manually or automatically. In an embodiment, the viewer logs in prior to the selected schedule, views multimedia content and confirms the viewing to accrue items of value. The accrued items of value can be debited later in order to unlock premium multimedia content. The selected multimedia content begins streaming through the set top box in the order selected by the viewer. For instance, a first multimedia content begins to play on the television set in real time. A challenge-response interaction takes place during and/or after the first multimedia content is played. The viewer completes the challenge-response interaction by interacting with the GUI elements via the remote control. A response report is generated when the viewer enters a response for the challenge presented during the challenge-response interaction. A second multimedia content begins playing on the television set in real time, and the viewer undergoes another challenge-response interaction while viewing the second multimedia content, and so on. The viewer accrues compensation for confirming that the viewer has viewed the selected multimedia content based on the generated response reports. The e-wallet 502i associated with the viewer account reflects the accrued compensation. The accrued compensation, in aggregate, may equal the value of premium multimedia content, and when the premium multimedia content value is reached, the viewer is notified that the premium multimedia content can be played in its entirety.

In another example, the viewer uses a computer with a web browser to create the viewer account via a front-end of the server 502. Subsequently, the viewer is presented a search engine style interface, wherein the viewer can search by product name or other metadata to discover available multimedia content. The viewer selects one or more of the discovered multimedia content for on-demand streaming. The selected multimedia content is streamed through the web browser based on the viewing parameters selected by the viewer. The viewer undergoes a challenge-response interaction while viewing the selected multimedia content. A response report is generated when the viewer enters a response for a presented challenge. The viewer accrues compensation for confirming that the viewer has viewed the selected multimedia content based on the generated response report. The e-wallet 502$i$ associated with the viewer account reflects the accrued compensation. The accrued compensation, in aggregate, may equal the value of premium multimedia content, and when the premium multimedia content value is reached, the viewer is notified that the premium multimedia content can be played in its entirety. The viewer may also purchase products and services on an e-commerce platform by redeeming the accrued compensation.

Figure 13A:
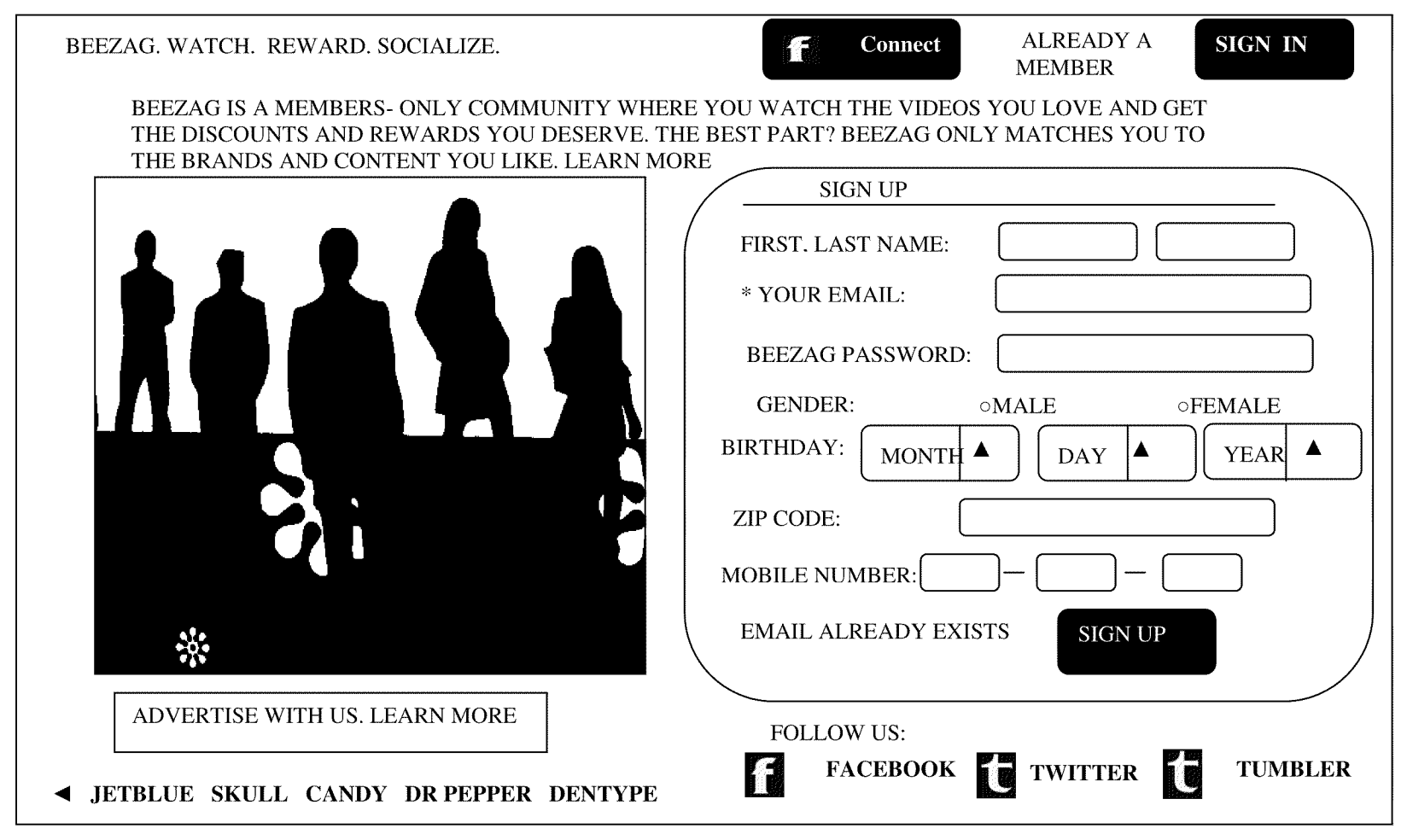
Figure 13B:
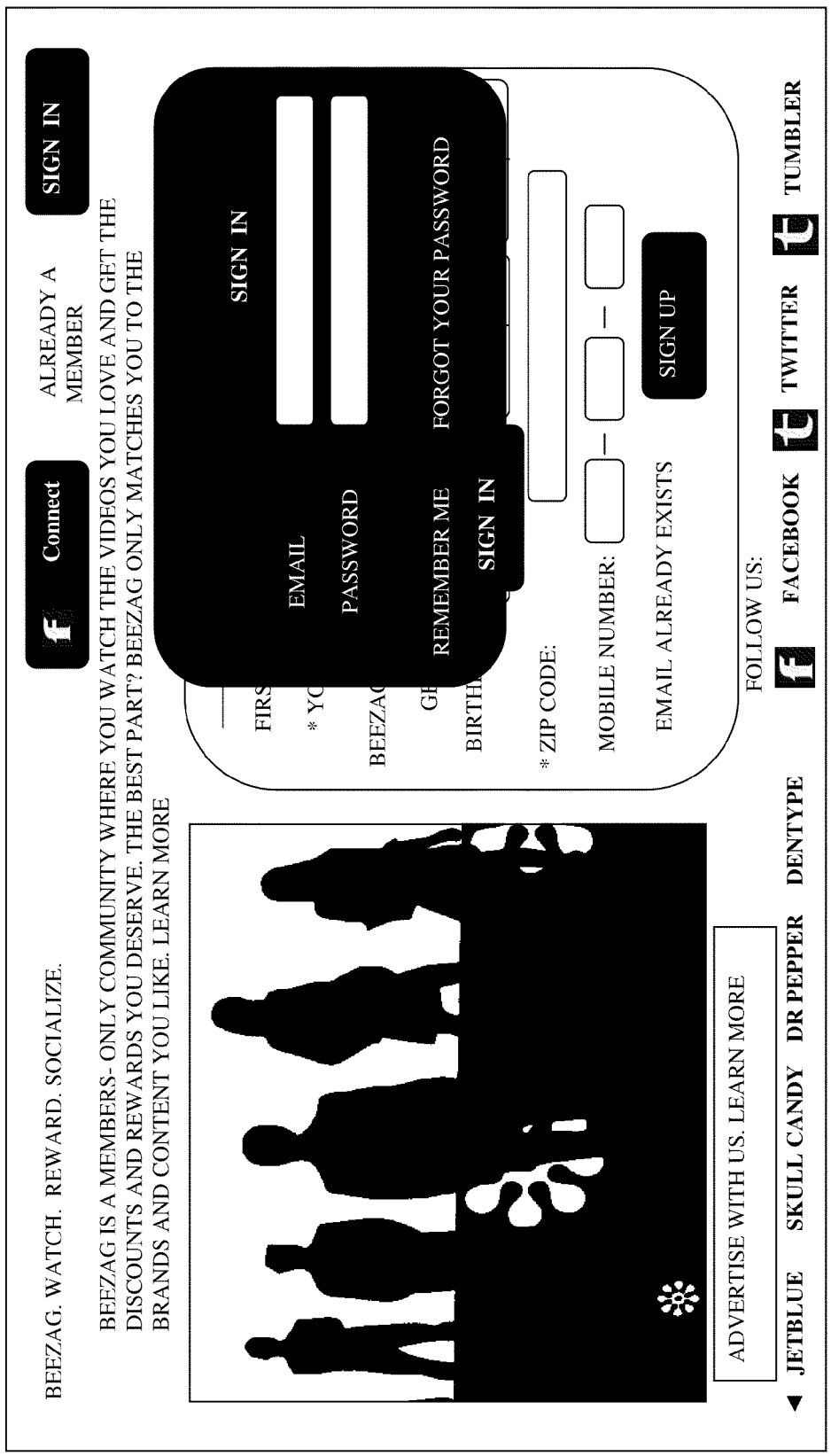
Figure 13C:
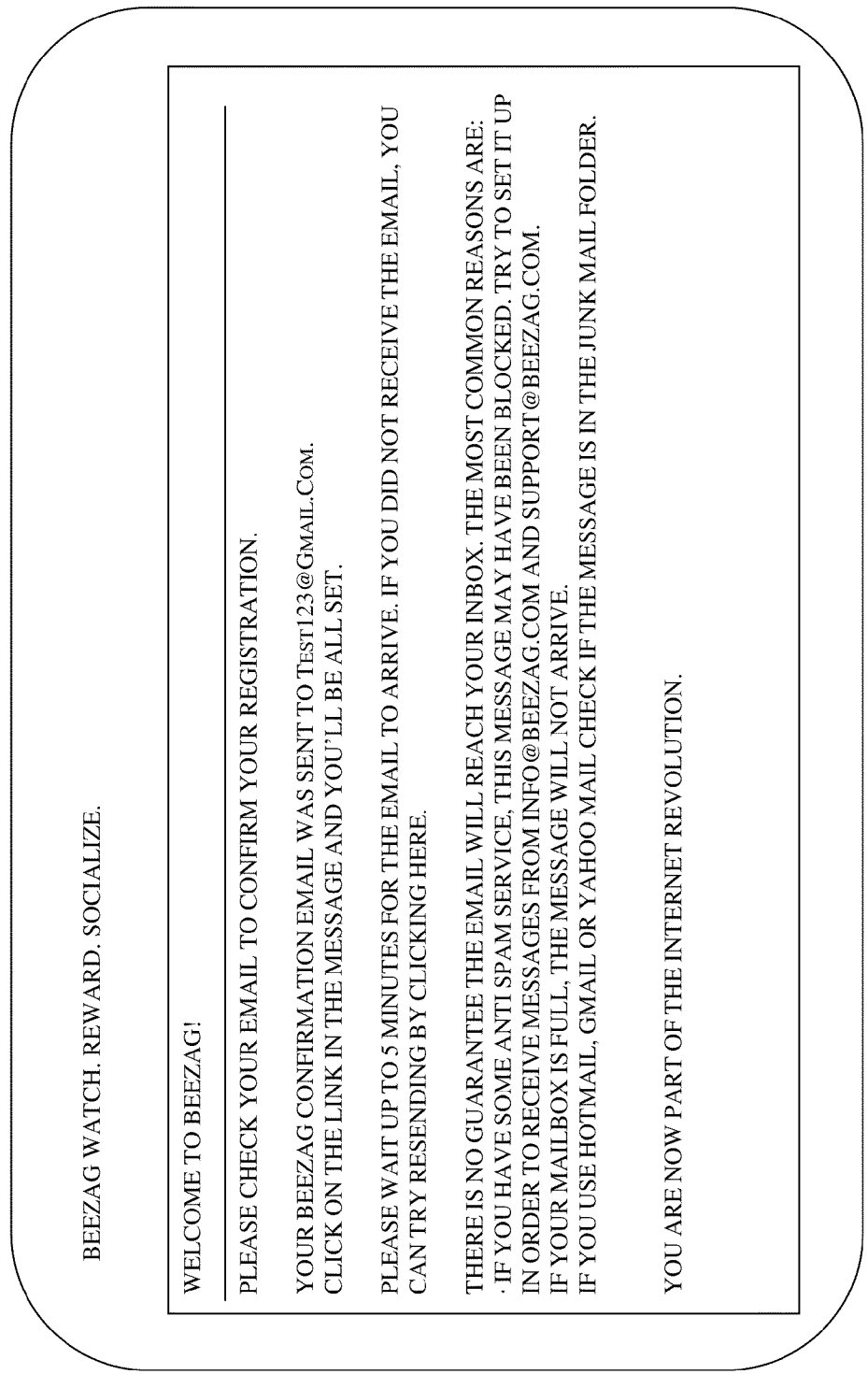
Figure 13D:
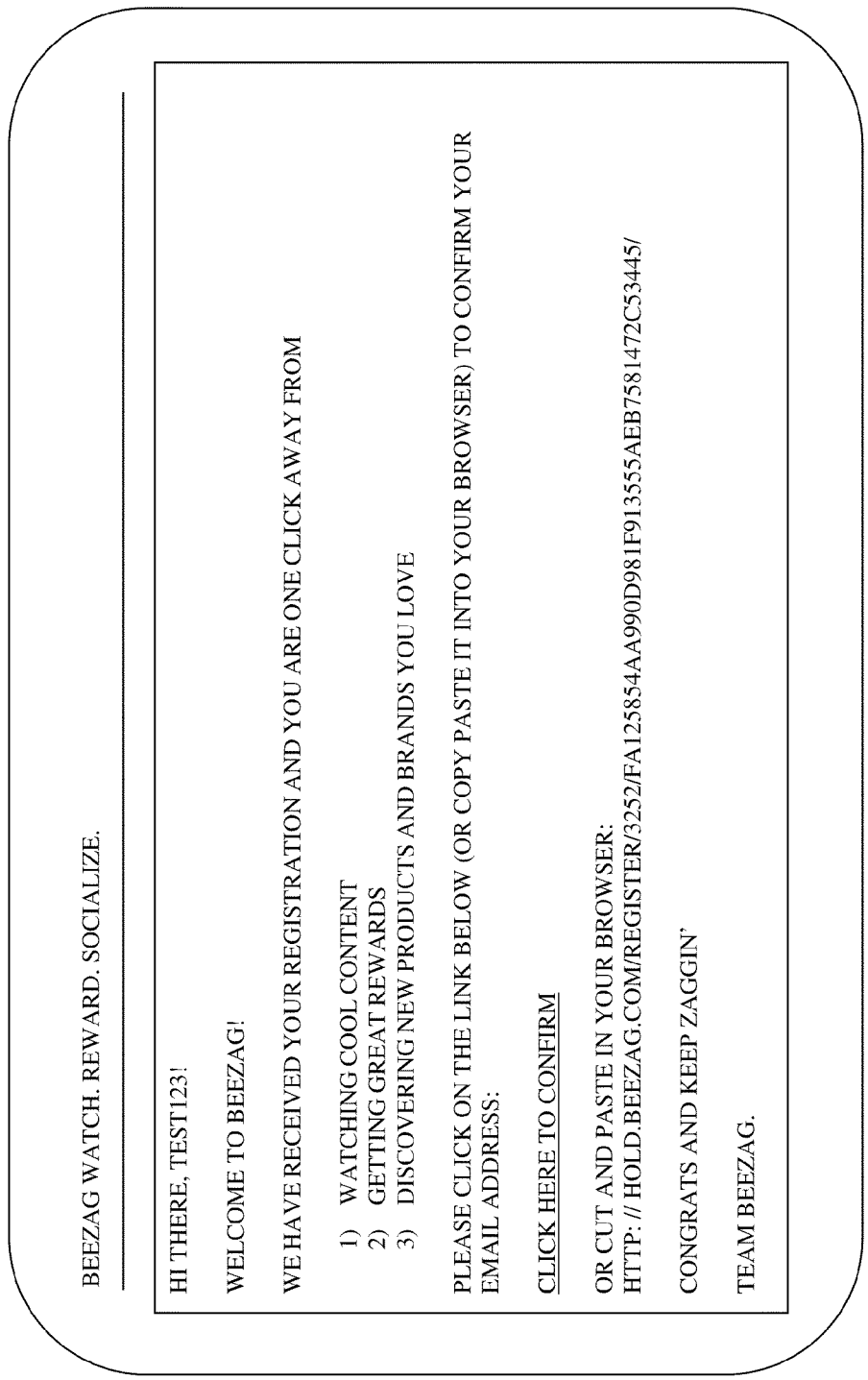
Figure 13E:
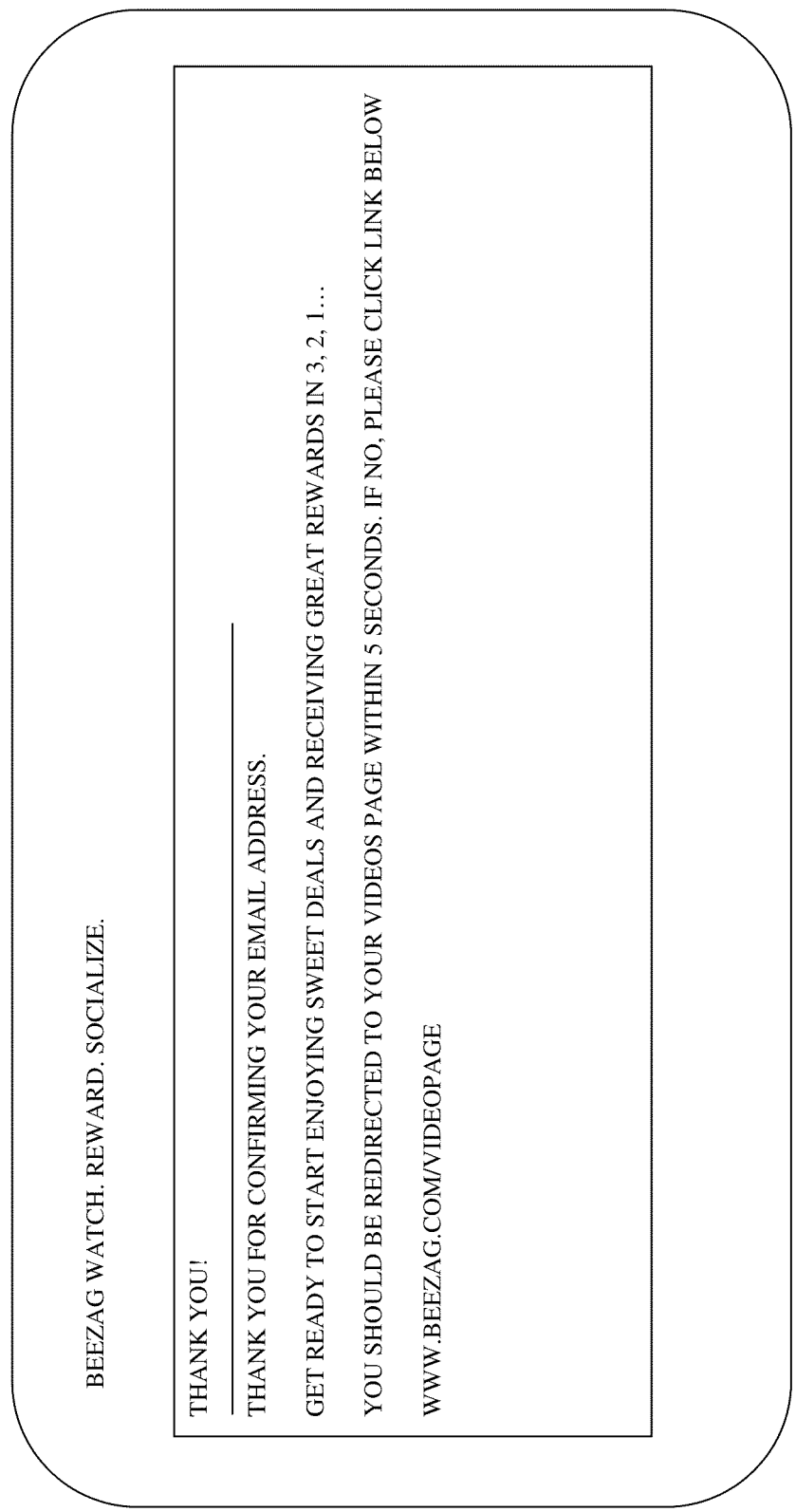

Consider another example where the viewer accesses the server 502 for the first time through a web front-end, for example, a web site, via the client device 501 of the viewer. When the viewer accesses the website hosted by the server 502, the viewer is presented with a login web page as exemplarily illustrated in FIG. 13A. The server 502 prompts the viewer to provide viewer credentials as exemplarily illustrated in FIG. 13B to access the server 502. The viewer may supply an electronic mail (email) address to the server 502. The server 502 verifies whether the viewer is accessing the server 502 for the first time using the email address provided by the viewer. If the viewer is accessing the server 502 for the first time, the server 502 prompts the viewer to register with the server 502 by transmitting a first confirmation link to the email address provided by the viewer as exemplarily illustrated in FIG. 13C. If the viewer clicks on the first confirmation link transmitted by the server 502, the first confirmation link redirects the viewer to a webpage that prompts the viewer to click on a second confirmation link for confirming the registration of the viewer with the server 502 as exemplarily illustrated in FIG. 13D. When the viewer clicks on the second confirmation link, the server 502 sends a notification message to the viewer to confirm the viewer's registration with the server 502 as exemplarily illustrated in FIG. 13E.

Figure 14A:
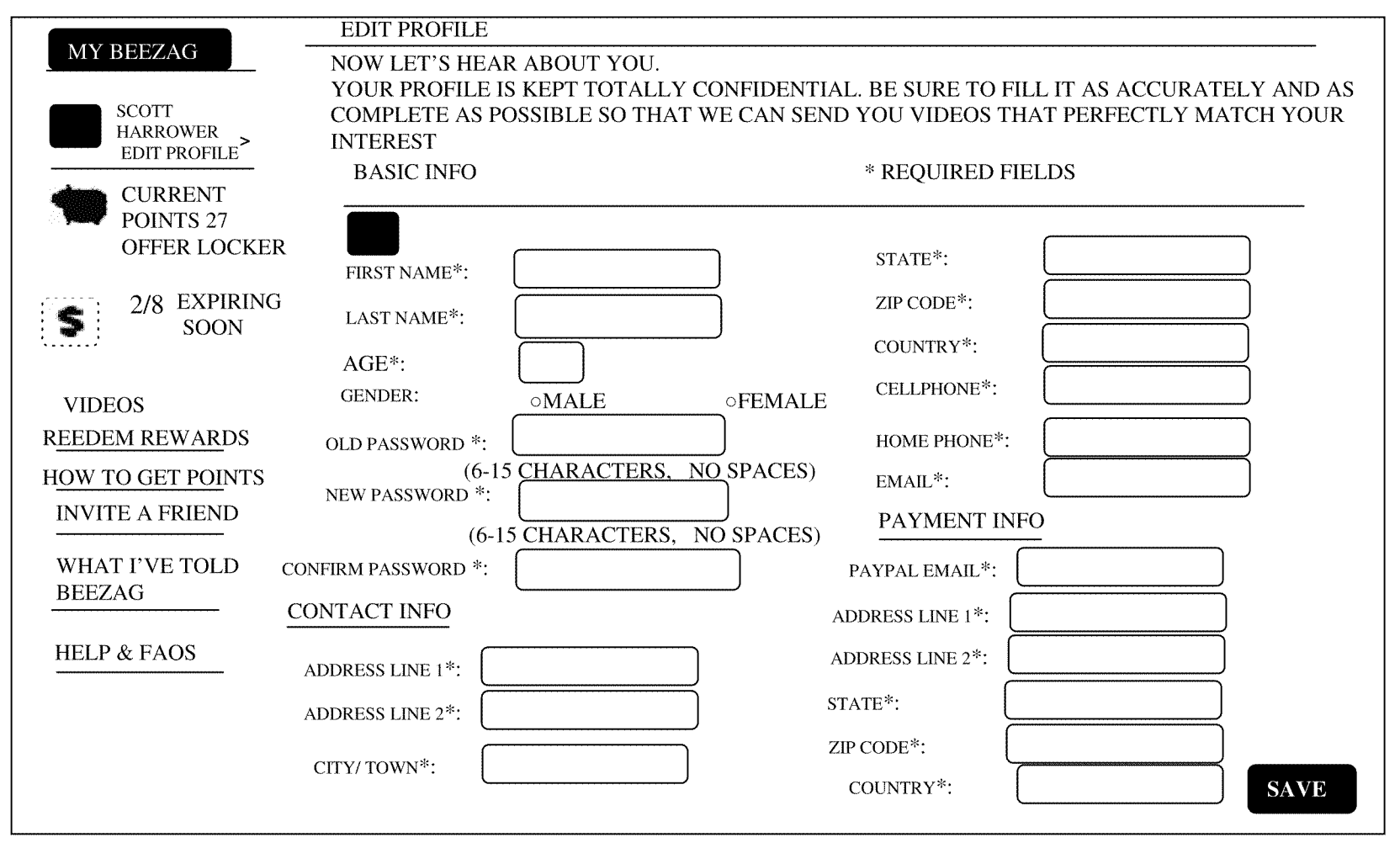
Figure 14B:
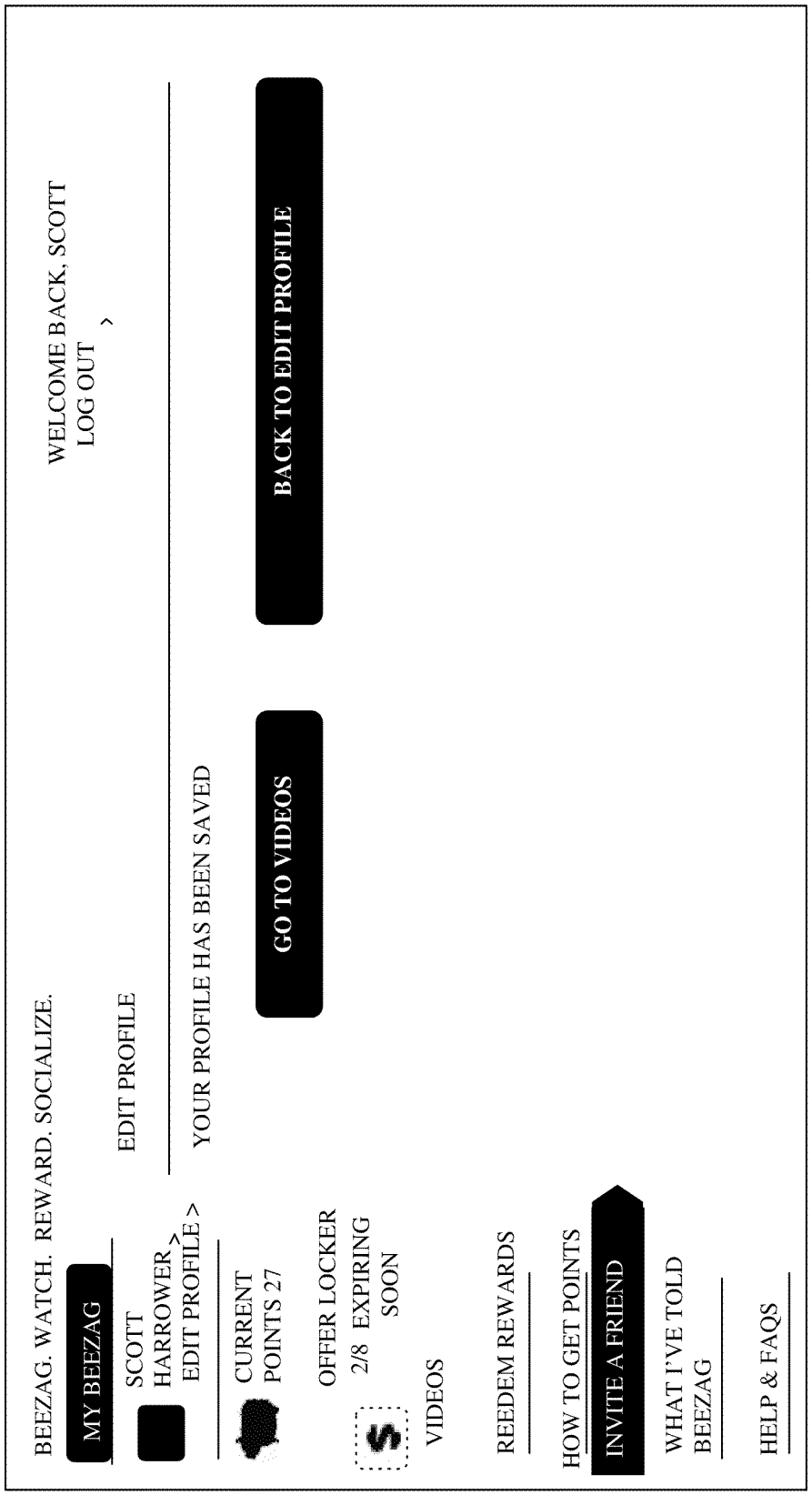

When registration of the viewer with the server 502 is complete, the server 502 enables the viewer to create a profile by submitting information such as personal information, marketing information, etc., as exemplarily illustrated in FIG. 14A. When the viewer edits and updates the information, the server 502 confirms the updating and saving of the information of the viewer as exemplarily illustrated in FIG. 14B.

Figure 15B:
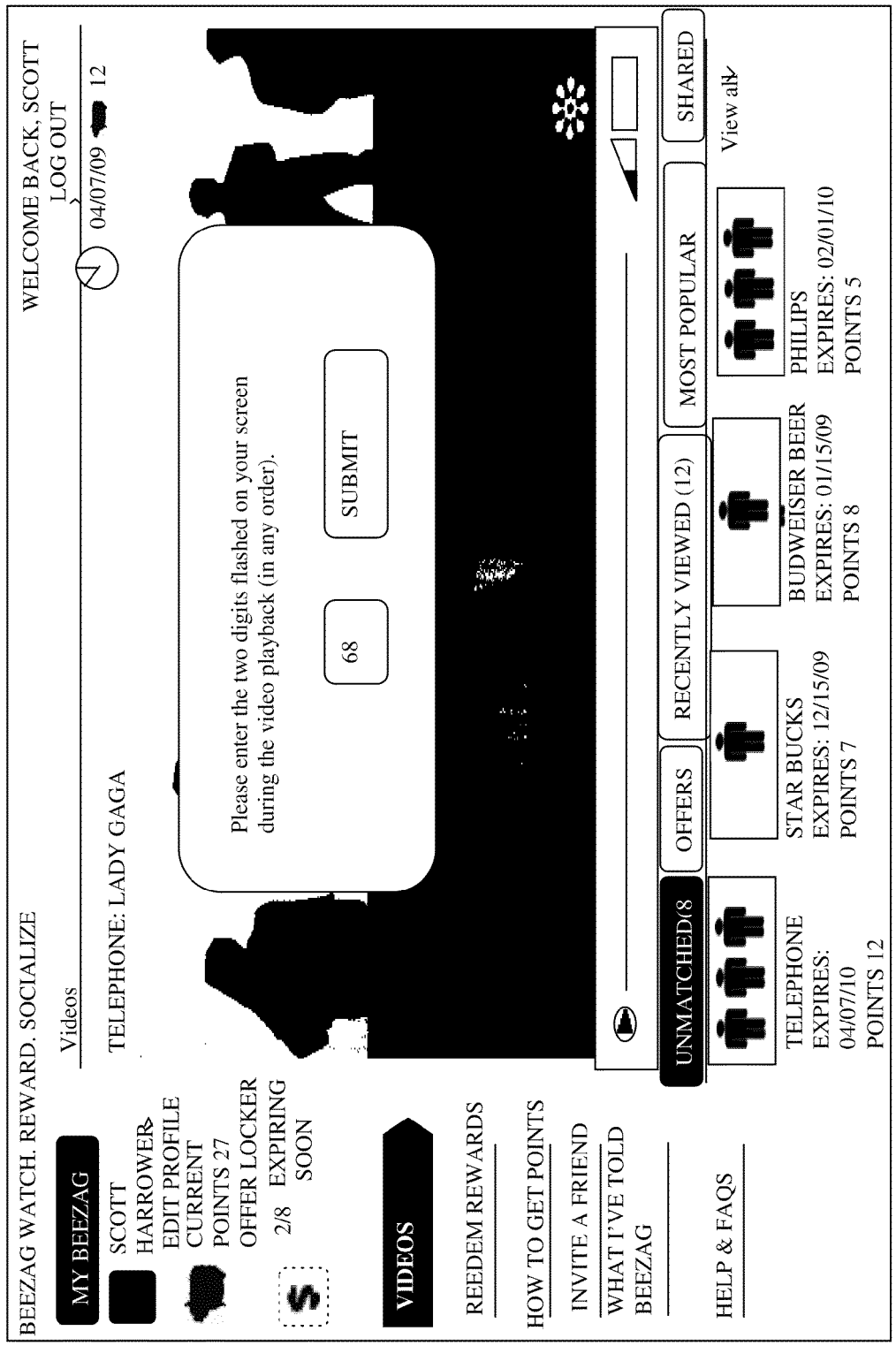
Figure 15C:
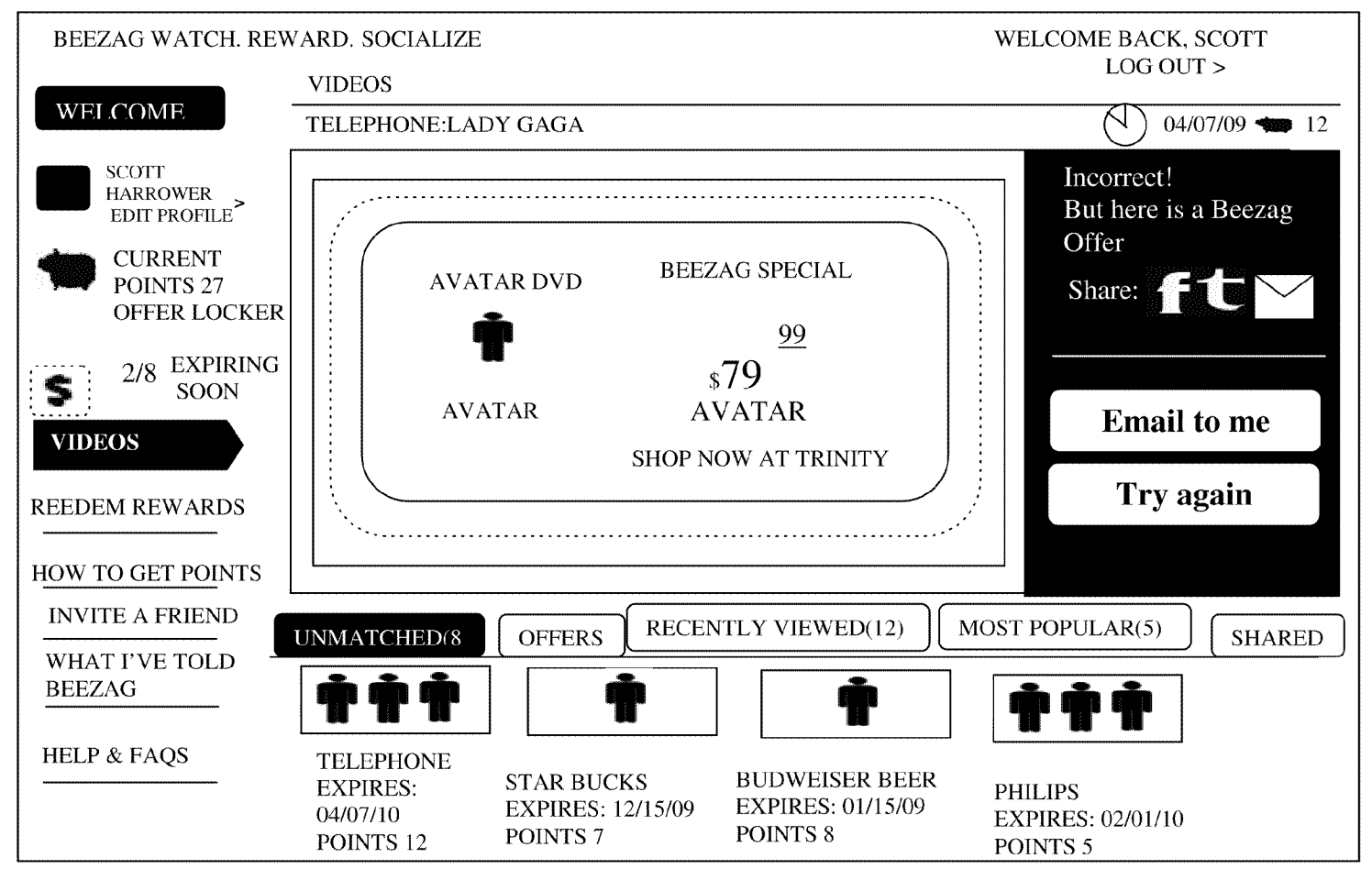
Figure 16B:
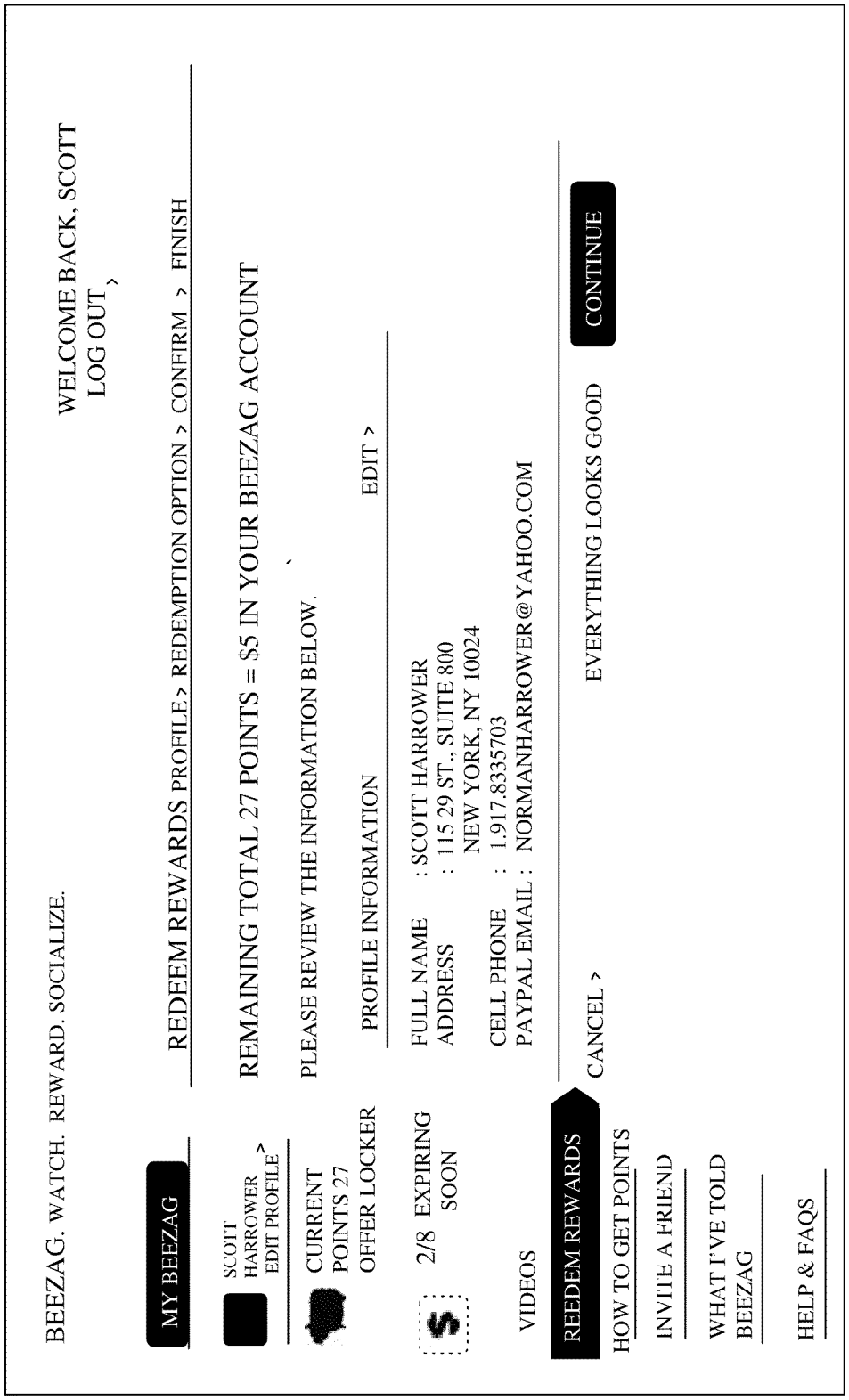
Figure 16C:

The viewer receives a list of videos on the client device 501 from the server 502 for selection. The viewer selects a popular music video for viewing in real time. The server 502 plays the selected music video on the viewer's client device 501 as exemplarily illustrated in FIG. 15A. The server 502 presents a random challenge on the selected music video and invokes a response from the viewer for confirming viewing of the selected music video as exemplarily illustrated in FIG. 15B. The server 502 verifies the correctness of the response to confirm viewing of the selected music video and provides the viewer with an offer. The server 502 inserts an interactive promotional segment, for example, a clickable coupon, within the selected multimedia content as exemplarily illustrated in FIG. 15C. The clickable coupon directs the viewer to an e-commerce platform for enabling the viewer to purchase products, for example, digital versatile discs (DVDs) and services associated with the selected multimedia content on the e-commerce platform.

Figure 17:
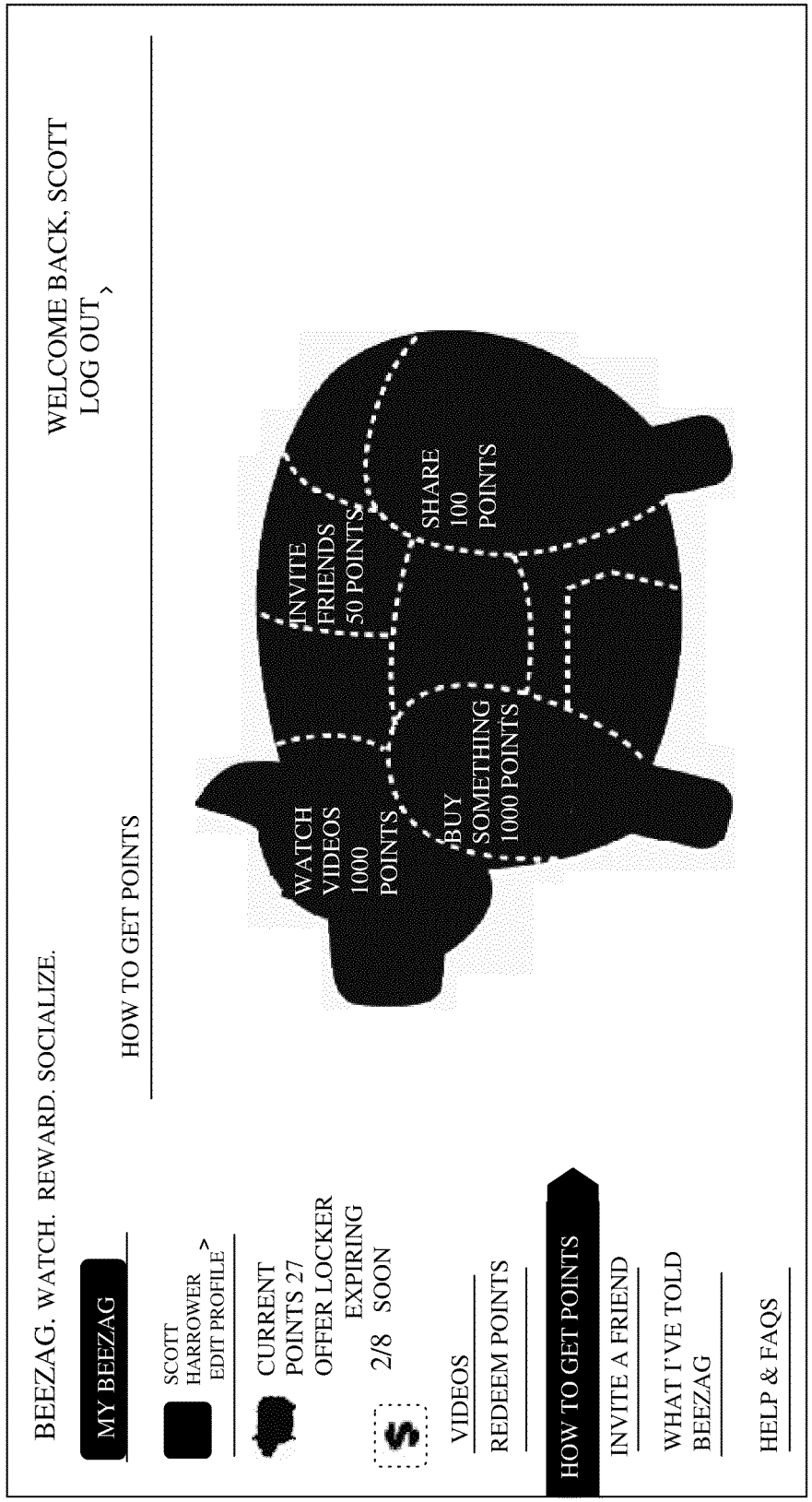
FIG. 17 exemplarily illustrate a screenshot showing methods of accruing items of value by the viewer.

FIGS. 16A-16E exemplarily illustrate screenshots of compensations accumulated and redeemed by the viewer. The server 502 credits the viewer with items of value such as points in the viewer's account or e-wallet 502$i$ based on the viewing of the videos by the viewer as exemplarily illustrated in FIG. 16A. The server 502 may convert the items of value accrued in the viewer's e-wallet 502$i$ to, for example, cash for redemption as exemplarily illustrated in FIGS. 16B-16C. The server 502 also provides options, for example, payment options, donations to charity, etc. for redeeming the accrued items of value. The server 502 enables the viewer to redeem the compensation via a method selected by the viewer as exemplarily illustrated in FIG. 16D. The server 502 provides the viewer with an overall summary of the accrued compensation after the redemption as exemplarily illustrated in FIG. 16E. The server 502 may further provide recommendations or methods for accruing additional compensation or items of value by the viewer as exemplarily illustrated in FIG. 17.

Figure 18:
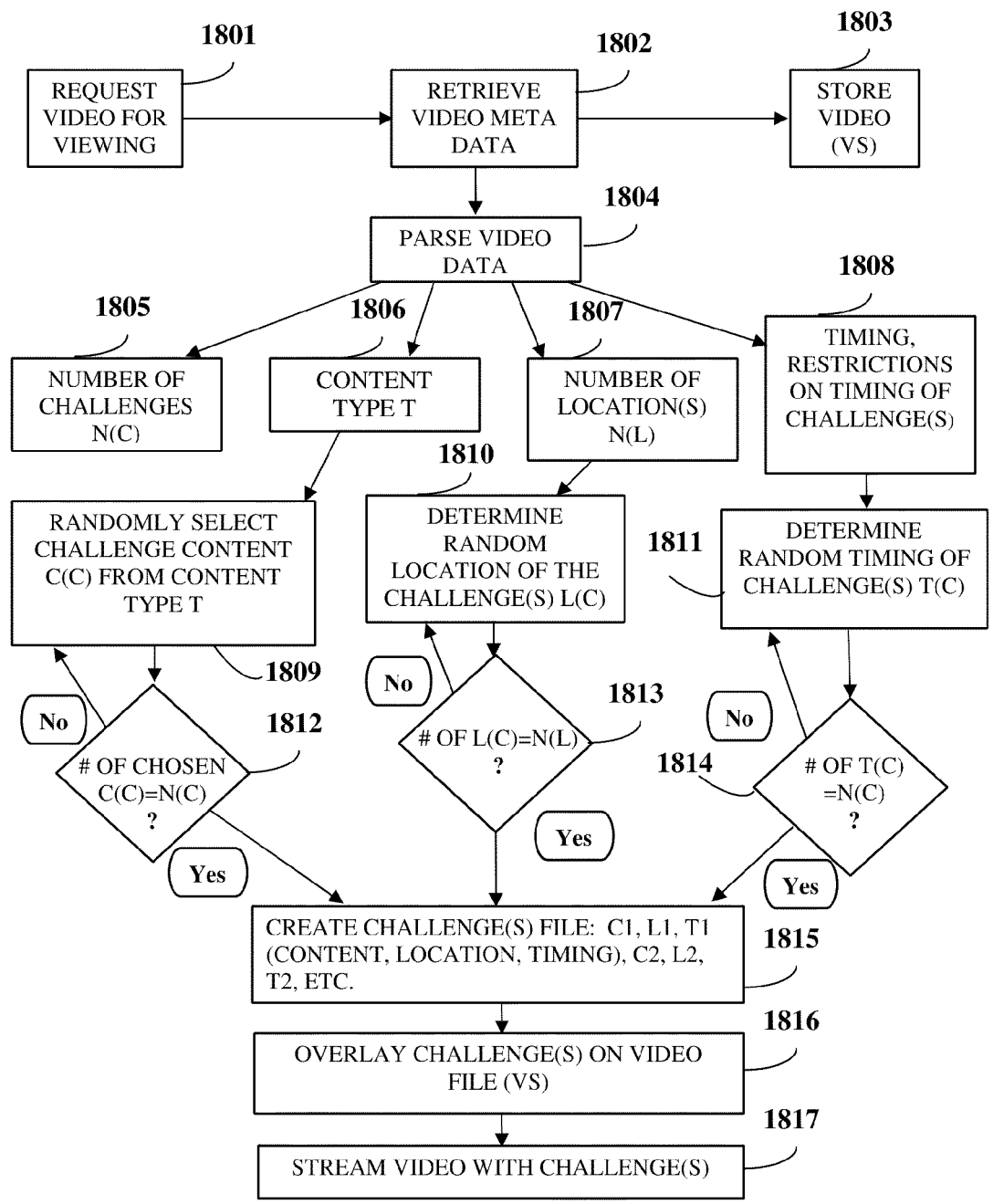
FIG. 18 exemplarily illustrate a flow diagram for generating and presenting random challenges on multimedia content.

FIG. 18 exemplarily illustrates a flow diagram for generating and presenting random challenges on multimedia content. The viewer requests 1801$a$ video for viewing from the server 502. The client device 501 receives the requested video and also retrieves 1802 the metadata associated with the video. The video is stored 1803 in the client device 501. The metadata of the video is parsed 1804 to determine, for example, the duration of the video. The challenge parameters, for example, the number of challenges 1805, the type of content 1806, the number of locations 1807 within predefined limits, the timing 1808 of the challenges including restrictions on the timing of the challenges are invoked based on the metadata of the video. One or more of the random challenge content is randomly selected 1809 from the available content types. The random locations and timing of the challenges are also determined 1810 and 1811. The selected content is verified to determine whether the challenge content is within the limits of the invoked parameters, such as the number of challenges 1812, number of locations 1813, timing restrictions 1814, etc. The challenge files are created 1815 with the selected challenge content, locations, and timing. The challenge content in the challenge files created are overlaid 1816 on the stored video. The video with the incorporated challenge content is streamed 1817 or played to the viewer.

FIGS. 19A-19G exemplarily illustrate a C++ implementation of the challenge generator 501$c$ using Microsoft® Visual Studio® of Microsoft Inc. In the C++ code listing including the header files of FIGS. 19A-19G, two test cases are established for the challenge generator 501$c$. The two test cases are defined in the C++ code listing of FIG. 19A. The first test case generates a sequence of challenges for a 30 second video until the end of the video. The second test case generates a challenge within every 10 second segment of a video clip. The implementation exemplarily comprises two classes, namely, "Class bzChallengeGenerator" and "Class bzChallenge". The code for implementing the "Class bzChallengeGenerator" is exemplarily illustrated in FIGS. 19B-19C. The code for implementing the "Class bzChallenge" is exemplarily illustrated in FIG. 19F. FIGS. 19D-19E and FIG. 19G illustrate example header file definitions of "bzChallengeGenerator.h" and "bzChallenge.h", "Class bzChallengeGenerator" is used to specify the necessary parameters and generate a challenge within an optional sub-segment of the video. The static members of "Class bzChallengeGenerator" comprise the following:

"static const char* s_content[ ]" is an array of arrays of character instances comprising numbers, letters, or symbols. This implementation assumes that the challenge content data type is, for example, a single byte character, however the content's data type has alternate definitions in other implementations.

"static const unsigned int s_contentDuration" is the duration of the display of the content. For example, this value is kept constant at 3 seconds in this implementation, but may vary in other implementations.

Class bzChallengeGenerator also defines an enumerated data type as follows:

"enum ContentTypeEnum {NUMBERS=0, LETTERS=1, SYMBOLS=2}" identifies the character set to be used.

Class bzChallengeGenerator also defines the following data members:

"ContentTypeEnum m_contentType" defines the type of characters to be displayed in the video as a challenge.

"unsigned int m_contentDisplaySize" defines the size of the content's display area (square), in pixels, within a video display frame.

"unsigned int m_videoDisplayWidth" is the width of the video display frame, in pixels.

"unsigned int m_videoDisplayHeight" is the height of the video display frame, in pixels.

"unsigned int m_videoDuration" is the total play time of the video.

The following methods are defined in the Class bzChallengeGenerator:

"static int RangedRand(int from, int to)"—this class method returns a random integer in the closed interval [from, to].

"bzChallenge Generate(int begin=-1, int end=-1) const"—this method generates a random challenge with the specified properties. The caller optionally specifies the end points of a segment within the entire video in order to satisfy timing constraints of the application, for example, to ensure that a challenge is displayed in the last 20% or 10 seconds of the video's play time. An object of type bzChallenge is returned with the necessary attributes.

Class bzChallenge represents a result of the challenge generator 501c in the form of a challenge object. Class bzChallenge defines the following data members:

"char m_content"—selection of challenge content to display.

"unsigned int m_contentDisplaySize"—content display area in pixels (square).

"unsigned int m_offset"—offset in seconds from the beginning and the end of the video when the challenge content is displayed.

"unsigned int m_duration"—the duration of the display of challenge content.

"unsigned int m_xPosition"—the pixel position along the width of the display area where the challenge content is displayed.

"unsigned int m_yPosition"—the pixel position along the height of the display area where the challenge content is displayed.

This implementation randomly selects a position for the challenge content's display area within the specified dimensions of the video display frame. Alternatively, the implementation uses an external location map that defines discrete placements of the challenge content on the video display frame. In the alternative case, the challenge generator 501c randomly selects an index into the location map. FIG. 20 exemplarily illustrates sample output after executing the two test cases twice, referred to as "Run #1" and "Run #2". In an example of the first test case, the challenge generator 501c generates "3" as the challenge content that will be presented after 19 seconds from the start of the multimedia content for a duration of 3 seconds. The challenge generator 501c then generates "2" as the challenge content that will be presented after 26 seconds from the start of the multimedia content for a duration of 3 seconds. The challenge generator 501c also generates the coordinates (233, 8) and (29, 134) as the locations for presenting the challenge content "3" and "2" respectively, wherein the coordinates are selected within the video display frame. In an example of the second test case, the challenge generator 501c generates "7" as the challenge content that will be presented within the first 10 second segment, then generates "2" as the challenge content that will be presented within the second 10 second segment, and generates "9" as the challenge content that will be presented within the third 10 second segment. The challenge generator 501c also generates the coordinates (89, 16), (58, 171), and (151, 109) as the locations for presenting the challenge content "7", "2", and "9" respectively, wherein the coordinates are selected within the video display frame. Accordingly, the challenge generator 501c can generate a theoretically infinite number of new challenges, random in content, based on permutation and combination of the input to the challenge generator 501c and the challenge generation algorithm.

For the purposes of illustration, the detailed description refers to a single client device 501; however the scope of the computer implemented method and system 500 disclosed herein is not limited to the client device 501 but may be extended to include multiple client devices and multiple levels of client devices.

For purposes of illustration, the detailed description refers to the server 502 being run locally on a computer system 600; however the scope of the computer implemented method and system 500 disclosed herein is not limited to the server 502 being run locally on a computer system 600 via the operating system and the processor 601 but may be extended to run remotely over the network 503 by employing a web browser and remote server, mobile phone, or other electronic devices.

The server 502 for confirming viewing of multimedia content by the viewer may also be implemented on operating systems for mobile devices, for example, Windows Mobile®, Symbian, Google™ Android, or iPhone® of Apple Inc. Mobile implementation uses similar algorithms but may involve different hardware interfaces. For example, selection of the list of multimedia content and viewing parameters by the viewer may be performed via a touch screen or voice recognition, and messages may be created using an on-screen keypad or slide-out keyboard, communicating with client software on the mobile device or in a mobile browser. Message transmission then occurs using the mobile device's internet capabilities via a network 503, for example, a WiFi network, a satellite network, a cellular network, etc. The server 502 may also be implemented on two different devices, for example, a desktop and a mobile device, to facilitate communication between them.

It will be readily apparent that the various methods and algorithms described herein may be implemented in a computer readable medium appropriately programmed for general purpose computers and computing devices. Typically a processor, for example, one or more microprocessors will receive instructions from a memory or like device, and execute those instructions, thereby performing one or more processes defined by those instructions. Further, programs that implement such methods and algorithms may be stored and transmitted using a variety of media, for example, computer readable media in a number of manners. In an embodiment, hard-wired circuitry or custom hardware may be used in place of, or in combination with, software instructions for implementation of the processes of various embodiments. Thus, embodiments are not limited to any specific combination of hardware and software. A "processor" means any one or more microprocessors, central processing unit (CPU) devices, computing devices, microcontrollers, digital signal processors or like devices. The term "computer readable medium" refers to any medium that participates in providing data, for example instructions that may be read by a computer, a processor or a like device. Such a medium may take many forms, including but not limited to, non-volatile media, volatile media, and transmission media. Non-volatile media include, for example, optical or magnetic disks and other persistent memory volatile media include dynamic random access memory (DRAM), which typically constitutes the main memory. Transmission media include coaxial cables, copper wire and fiber optics, including the wires that comprise a system bus coupled to the processor. Common forms of computer readable media include, for example, a floppy disk, a flexible disk, hard disk, magnetic tape, any other magnetic medium, a compact disc-read only memory (CD-ROM), digital versatile disc (DVD), any other optical medium, punch cards, paper tape, any other physical medium with patterns of holes, a random access memory (RAM), a programmable read only memory (PROM), an erasable programmable read only memory (EPROM), an electrically erasable programmable read only memory (EEPROM), a flash memory, any other memory chip or cartridge, a carrier wave as described hereinafter, or any other medium from which a computer can read. In general, the computer readable programs may be implemented in any programming language. Some examples of languages that can be used include C, C++, C#, Perl, Python, or JAVA. The software programs may be stored on or in one or more mediums as an object code. A computer program product comprising computer executable instructions embodied in a computer readable medium comprises computer parsable codes for the implementation of the processes of various embodiments.

Where databases are described such as the database 502*d*, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats including relational databases, object-based models and/or distributed databases could be used to store and manipulate the data types described herein Likewise, object methods or behaviors of a database can be used to implement various processes, such as the described herein. In addition, the databases may, in a known manner, be stored locally or remotely from a device that accesses data in such a database.

The present invention can be configured to work in a network environment including a computer that is in communication, via a communications network, with one or more devices. The computer may communicate with the devices directly or indirectly, via a wired or wireless medium such as the Internet, a local area network (LAN), a wide area network (WAN) or the Ethernet, token ring, or via any appropriate communications means or combination of communications means. Each of the devices may comprise computers, such as those based on the Intel® processors, AMD® processors, UltraSPARC® processors, Sun® processors, IBM® processors, etc. that are adapted to communicate with the computer. Any number and type of machines may be in communication with the computer.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

We claim:

1. A computer implemented method for confirming that a viewer viewed multimedia content on a client device, comprising:
    providing said client device configured for creation of a viewer account on a server for generating viewer credentials;
    configuring said client device so that said viewer may access said server by supplying said generated viewer credentials;
    receiving a list of multimedia content and viewing parameters by said client device from said server for selection;
    configuring said client device to allow said viewer to select one or more of said viewing parameters and one or more of said multimedia content from said list of multimedia content;
    receiving and playing said selected multimedia content by said client device based on said selected one or more viewing parameters;
    configuring said client device to confirm viewing of said selected multimedia content by, comprising:
        generating a plurality of random challenges by said client device using a random challenge generator residing in said client device, wherein said random challenge generator is configured to generate an infinite number of random challenges, wherein said random challenges are generated during play of said selected multimedia content on said client device;
        configuring said client device to present said random challenges on said client device, wherein each of said random challenges are:
            random in content, wherein content of each random challenge is new with respect to the content of any other random challenge generated and presented to said viewer; and
            unrelated to said multimedia content;
    configuring said client device to allow said viewer to enter a response for said presented challenges;
    checking for correctness of said viewer's response by said client device using a challenge-response module residing in said client device;
    generating a response report based on said viewer's response; and
    compensating said viewer with one or more items of value if said response report confirms said viewing of said selected multimedia content by said viewer.

2. The computer implemented method of claim 1, further comprising providing said viewer with an electronic wallet associated with said viewer account for accruing said one or more items of value over a period of time.

3. The computer implemented method of claim 2, wherein said compensating said viewer comprises depositing said one or more items of value into said electronic wallet and debiting a fee from a multimedia content owner, if said response report confirms said viewing of said selected multimedia content by said viewer.

4. The computer implemented method of claim 2, further comprising enabling said viewer to purchase products and services on an electronic commerce platform using said one or more items of value accrued in said electronic wallet, by said server.

5. The computer implemented method of claim 2, further comprising providing said viewer with an option of triggering playback of premium multimedia content in exchange for said one or more items of value accrued in said electronic wallet and allowing said premium multimedia content to play.

6. The computer implemented method of claim 1, wherein said creation of said viewer account comprises acquiring information from said viewer by said server, wherein said information comprises one or more of personal information, marketing information, and credit worthiness of said viewer.

7. The computer implemented method of claim 1, wherein said viewing parameters comprise one or more of a schedule and an order of playing said selected multimedia content.

8. The computer implemented method of claim 1, wherein said confirming said viewing of said selected multimedia content by said viewer comprises:
   presenting said random challenges to said viewer by overlaying said random challenges on said selected multimedia content; and
   invoking a response from said viewer for said presented random challenges, wherein said response determines whether said viewer has viewed said multimedia content.

9. The computer implemented method of claim 1, wherein said confirming said viewing of said selected multimedia content by said viewer comprises:
   interrupting said play of said selected multimedia content after an interrupt time period for presenting said random challenges and
   invoking a response from said viewer for said presented random challenges, wherein said response determines whether said viewer has viewed said multimedia content.

10. The computer implemented method of claim 1, further comprising storing said selected multimedia content on said client device for viewing at a time selected by said viewer.

11. The computer implemented method of claim 10, wherein said client device presents said random challenges to said viewer for confirming said viewing of said selected multimedia content by said viewer, wherein said client device generates said response
   report based on said viewing of said selected multimedia content by said viewer and stores said generated response report on said client device.

12. The computer implemented method of claim 11, wherein said client device transmits said response report to said server for compensating said viewer with said one or more items of value if said response report confirms said viewing of said selected multimedia content by said viewer.

13. A computer implemented method for confirming that a viewer viewed multimedia content on a client device, comprising:
   providing a server configured so that a viewer may create a viewer account on said server for generating viewer credentials, wherein said server provides said viewer with controlled access to said server;
   transmitting a list of multimedia content and viewing parameters to said client device from said server for selection;
   providing that said server is configured to allow said viewer to acquire one or more of said viewing parameters and one or more of said multimedia content from said list of multimedia content;
   transmitting said selected multimedia content to said client device for playing based on said selected one or more viewing parameters;
   confirming that said multimedia content has been viewed on said client device by presenting a plurality of random challenges on said client device wherein said server is configured to generate and send an
   infinite number of random challenges to said client device, and wherein each of said random challenge is:
      random in content, and wherein content of each random challenge is new with respect to the content of any other random challenge generated and presented to said viewer
      unrelated to said multimedia content;
      presented at random times during and/or after said play of said selected multimedia content; and
      presented at random physical locations on said selected multimedia content;
   generating a response report by said server based on said viewing of said selected multimedia content by said viewer; and
   compensating said viewer with one or more items of value by said server if said response report confirms said viewing of said selected multimedia content by said viewer.

14. The computer implemented method of claim 13, wherein said server transmits a list of said multimedia content preselected by said viewer, wherein said client device plays said preselected multimedia content in one of real time and at a time selected by said viewer.

15. The computer implemented method of claim 13, wherein said server transmits a list of said multimedia content based on preferences selected by said viewer.

16. The computer implemented method of claim 13, wherein said server compensates said viewer by allowing said viewer to view premium multimedia content in exchange for said one or more items of value.

17. The computer implemented method of claim 13, wherein said server transmits said selected multimedia content from a location referenced by a multimedia content owner.

18. The computer implemented method of claim 13, wherein said server transmits said selected multimedia content to an intermediate system, wherein said intermediate system transmits said selected multimedia content to said client device at predetermined intervals of time.

19. A computer implemented system for confirming that a viewer viewed multimedia content on a client device, comprising:
   a server that provides controlled access to said viewer, comprising:
      an account creation module that creates a viewer account for said viewer for generating viewer credentials;
      a content management module that transmits a list of multimedia content and viewing parameters to said client device of said viewer for allowing said viewer to select said multimedia content from said transmitted list of multimedia content and said viewing parameters from said transmitted viewing parameters;

said content management module that acquires one or more of said viewing parameters and one or more of said multimedia content selected from said list of multimedia content, wherein said selected multimedia content is played on said client device based on said selected one or more viewing parameters; and a payment module that compensates said viewer with one or more items of value based on viewing of said selected multimedia content by said viewer;

a client device connected to said server via a network, wherein said client device receives said selected multimedia content from said server and plays said selected multimedia content on a display screen of said client device; and a view confirmation module on said client device, wherein said view confirmation module confirms viewing of said selected multimedia content by said viewer by presenting a plurality of random challenges on said client device;

said view confirmation module comprising a challenge generator, said challenge generator configured to generate an infinite number of random challenges, wherein each of said random challenge is:

random in content, wherein content of each random challenge is new with respect to the content of any other random challenge generated and presented to said viewer unrelated to said multimedia content; and generated within said client device during play of said selected multimedia content in said client device;

said view confirmation module further comprising a challenge response module configured for determining correctness of said viewer's response to said random challenges and said view confirmation module configured for generating a response report based on said viewer's response.

20. The computer implemented system of claim 19, wherein said server further comprises database that stores information of said viewer, said viewer credentials, preferences of said viewer, said multimedia content, locations of said multimedia content, and said viewing parameters, wherein said database stores said multimedia content in a plurality of formats.

21. The computer implemented system of claim 19, wherein said view confirmation module comprises: said challenge-response module that presents said generated random challenges to said viewer on said display screen of said client device by one of overlaying said generated random challenges on said selected multimedia content and inserting said generated random challenges on interruption of said play of said selected multimedia content, wherein said challenge-response module invokes said response from said viewer for said presented random challenges said challenge-response module that determines whether said viewer has entered said response for said presented random challenges to confirm said selected multimedia content has been viewed by said viewer; and a report generation module that generates said response report based on said response from said viewer.

22. The computer implemented system of claim 19, wherein said account creation module creates an electronic wallet associated with said viewer account for said viewer, wherein said electronic wallet accrues said one or more items of value over a period of time, wherein said payment module deposits said one or more items of value into said electronic wallet and debits a fee from a multimedia content owner, if said response report confirms said viewing of said selected multimedia content by said viewer.

23. The computer implemented system of claim 19, wherein said client device comprises a storage module for storing said selected multimedia content for viewing at a time selected by said viewer.

24. The computer implemented system of claim 19, further comprising an interactive interface for enabling said viewer to select said one or more viewing parameters and one or more of said multimedia content from said list of multimedia content.

25. A computer program product comprising computer executable instructions embodied in a non-transitory computer readable storage medium, wherein said computer program product comprises:

a first computer parsable program code for providing controlled access of a server to a viewer;

a second computer parsable program code for creating a viewer account for said viewer and generating viewer credentials;

a third computer parsable program code for receiving a list of multimedia content and viewing parameters by a client device of said viewer for selection by said viewer;

a fourth computer parsable program code for acquiring one or more of said viewing parameters and one or more multimedia content from said list of multimedia content selected by said viewer, wherein said selected multimedia content is played on said client device based on said selected one or more viewing parameters;

a fifth computer parsable program code for confirming viewing of said selected multimedia content by said viewer, said fifth computer parsable program code comprising:

a sixth computer parsable program code for generating a plurality of random challenges in a random challenge generator residing in said client device, wherein said random challenge generator is further configured by said sixth computer parsable program code for generating an infinite number of random challenges, wherein said random challenge generator generates said random challenges during play of said selected multimedia content on said client device;

a seventh computer parsable program code for presenting said random challenges on said client device, wherein each of said random challenges are:

random in content, wherein content of each random challenge is new with respect to the content of any other random challenge generated and presented to said viewer and unrelated to said multimedia content;

an eighth computer parsable program code for invoking a response from said viewer for said presented challenges a ninth computer parsable program code for checking for coffectness of said viewer's response by a challenge-response module in said client device;

a tenth computer parsable program code for generating a response report based on said viewer's response; and an eleventh computer parsable program code for compensating said viewer with one or more items of value if said response report confirms said viewing of said selected multimedia content by said viewer.

\* \* \* \* \*